(12) United States Patent
Suh et al.

(10) Patent No.: US 11,316,578 B2
(45) Date of Patent: Apr. 26, 2022

(54) COMMUNICATIONS IN SPATIAL STREAMS

(71) Applicant: HUAWEI TECHNOLOGIES CO., LTD., Guangdong (CN)

(72) Inventors: Jung Hoon Suh, Kanata (CA); Osama Aboul-Magd, Kanata (CA); Kwok Shum Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/122,024

(22) Filed: Dec. 15, 2020

(65) Prior Publication Data
US 2021/0099220 A1 Apr. 1, 2021

Related U.S. Application Data

(63) Continuation of application No. 16/296,711, filed on Mar. 8, 2019, now Pat. No. 10,873,383.

(51) Int. Cl.
| | | |
|---|---|---|
| *H04B 7/06* | (2006.01) | |
| *H04B 7/0495* | (2017.01) | |
| *H04B 7/0452* | (2017.01) | |
| *H04L 5/00* | (2006.01) | |

(52) U.S. Cl.
CPC ......... *H04B 7/0697* (2013.01); *H04B 7/0452* (2013.01); *H04B 7/0495* (2013.01); *H04L 5/0025* (2013.01)

(58) Field of Classification Search
CPC .. H04B 7/0452; H04B 7/0495; H04B 7/0697; H04L 5/0025
See application file for complete search history.

(56) References Cited

U.S. PATENT DOCUMENTS

| | | |
|---|---|---|
| 8,363,603 B2 | 1/2013 | Dong |
| 8,824,400 B2 | 9/2014 | Seok |
| 2006/0159120 A1 | 7/2006 | Kim |
| 2007/0286303 A1 | 12/2007 | Yamaura |
| 2011/0110454 A1 | 5/2011 | Sampath et al. |
| 2011/0188598 A1 | 8/2011 | Lee |
| 2012/0155415 A1 | 6/2012 | Seok |
| 2015/0139119 A1 | 5/2015 | Azizi |
| 2015/0207602 A1 | 7/2015 | Yang et al. |

(Continued)

FOREIGN PATENT DOCUMENTS

| | | |
|---|---|---|
| CN | 107241798 A | 10/2017 |
| WO | 2019174401 A1 | 9/2019 |

OTHER PUBLICATIONS

Mitsubishi Electric:"Nonlinear precoding schemes for NR MU-MIMO", 3GPP TSG-RAN WG1 #86, R1-166574, Göteborg, Sweden, Aug. 22-26, 2016, 11 pages.

(Continued)

*Primary Examiner* — Siu M Lee
(74) *Attorney, Agent, or Firm* — Slater Matsil, LLP

(57) ABSTRACT

In some examples, a first wireless device includes a network interface capable of communicating using 16 spatial streams; and at least one processor configured to allocate at least one spatial stream of the 16 spatial streams to a plurality of wireless devices, such that no wireless device of the plurality of wireless devices is allocated more than 4 spatial streams, and send a control information element indicating the allocation of the at least one spatial stream to the plurality of wireless devices.

20 Claims, 8 Drawing Sheets

(56) References Cited

U.S. PATENT DOCUMENTS

| | | |
|---|---|---|
| 2017/0094664 A1 | 3/2017 | Lee |
| 2017/0181136 A1* | 6/2017 | Bharadwaj ........ H04W 72/0453 |
| 2017/0366310 A1* | 12/2017 | Verma .................... H04L 5/005 |
| 2019/0052353 A1 | 2/2019 | Kim |
| 2019/0373586 A1 | 12/2019 | Verma |
| 2020/0015234 A1 | 1/2020 | Li |
| 2020/0177425 A1* | 6/2020 | Chen .................... H04L 5/0037 |

OTHER PUBLICATIONS

ISA/CN, International Search Report and Written Opinion for PCT/CN2020/072071 dated Apr. 13, 2020 (9 pages).

Geier, Eric, TechHive, PC World, How MU-MIMO Wi-Fi works to improve the speed and capacity of home networks, Jun. 1, 2016 (8 pages).

Wikipedia, Multi-user MIMO last edited Oct. 28, 2018 (3 pages).

Coleman, David, Cabling Installation & Maintenance, What does Multi-User (MU) mean when discussing 802.11ax? Jun. 15, 2018 (4 pages).

Shaw, Keith, Network World, What is MU-MIMO and why you need it in your wireless routers, Jan. 26, 2018 (6 pages).

IEEE P802.11ax™/D3.2, Draft Standard for Information technology—Telecommunications and information exchange between systems Local and metropolitan area networks—Specific requirements, Part 11: Wireless LAN Medium Access Control (MAC) and Physical Layer (PHY) Specifications Amendment 1: Enhancements for High Efficiency WLAN, Oct. 2018 (698 pages).

Huawei Technologies Co., Ltd., U.S. Appl. No. 17/020,747 entitled Data Transmission Method, Apparatus, and System filed Sep. 14, 2020 (131 pages).

\* cited by examiner

Spatial Configuration Table ← 300

| N_STA | Index B5...B0 | Nsts(1) | Nsts(2) | Nsts(3) | Nsts(4) | Nsts(5) | Nsts(6) | Nsts(7) | Nsts(8) | Nsts(9) | Nsts(10) | Nsts(11) | Nsts(12) | Nsts(13) | Nsts(14) | Nsts(15) | Nsts(16) | Total N_STS | Number of Entries |
|---|---|---|---|---|---|---|---|---|---|---|---|---|---|---|---|---|---|---|---|
| 2 | 000000-000011 | 1~4 | 1 | | | | | | | | | | | | | | | 2~5 | 10 |
|   | 000100-000110 | 2~4 | 2 | | | | | | | | | | | | | | | 4~6 | |
|   | 000111-001000 | 3~4 | 3 | | | | | | | | | | | | | | | 6~7 | |
|   | 001001 | 4 | 4 | | | | | | | | | | | | | | | 8 | |
| 3 | 000000-000011 | 1~4 | 1 | 1 | | | | | | | | | | | | | | 3~6 | 20 |
|   | 000100-000110 | 2~4 | 2 | 1 | | | | | | | | | | | | | | 5~7 | |
|   | 000111-001000 | 3~4 | 3 | 1 | | | | | | | | | | | | | | 7~8 | |
|   | 001001 | 4 | 4 | 1 | | | | | | | | | | | | | | 9 | |
|   | 001010-001100 | 2~4 | 2 | 2 | | | | | | | | | | | | | | 6~8 | |
|   | 001101-001110 | 3~4 | 3 | 2 | | | | | | | | | | | | | | 8~9 | |
|   | 001111 | 4 | 4 | 2 | | | | | | | | | | | | | | 10 | |
|   | 010000-010001 | 3~4 | 3 | 3 | | | | | | | | | | | | | | 9~10 | |
|   | 010010 | 4 | 4 | 3 | | | | | | | | | | | | | | 11 | |
|   | 010011 | 4 | 4 | 4 | | | | | | | | | | | | | | 12 | |
| 4 | 000000-000011 | 1~4 | 1 | 1 | 1 | | | | | | | | | | | | | 4~7 | 35 |
|   | 000100-000110 | 2~4 | 2 | 1 | 1 | | | | | | | | | | | | | 6~8 | |
|   | 000111-001000 | 3~4 | 3 | 1 | 1 | | | | | | | | | | | | | 8~9 | |
|   | 001001 | 4 | 4 | 1 | 1 | | | | | | | | | | | | | 10 | |
|   | 001010-001100 | 2~4 | 2 | 2 | 1 | | | | | | | | | | | | | 7~9 | |
|   | 001101-001110 | 3~4 | 3 | 2 | 1 | | | | | | | | | | | | | 9~10 | |
|   | 001111 | 4 | 4 | 2 | 1 | | | | | | | | | | | | | 11 | |
|   | 010000-010001 | 3~4 | 3 | 3 | 1 | | | | | | | | | | | | | 10~11 | |
|   | 010010 | 4 | 4 | 3 | 1 | | | | | | | | | | | | | 12 | |
|   | 010011 | 4 | 4 | 4 | 1 | | | | | | | | | | | | | 13 | |
|   | 010100-010110 | 2~4 | 2 | 2 | 2 | | | | | | | | | | | | | 8~10 | |
|   | 010111-011000 | 3~4 | 3 | 2 | 2 | | | | | | | | | | | | | 10~11 | |
|   | 011001 | 4 | 4 | 2 | 2 | | | | | | | | | | | | | 12 | |
|   | 011010-011011 | 3~4 | 3 | 3 | 2 | | | | | | | | | | | | | 11~12 | |
|   | 011100 | 4 | 4 | 3 | 2 | | | | | | | | | | | | | 13 | |
|   | 011101 | 4 | 4 | 4 | 2 | | | | | | | | | | | | | 14 | |
|   | 011110-011111 | 3~4 | 3 | 3 | 3 | | | | | | | | | | | | | 12~13 | |
|   | 100000 | 4 | 4 | 3 | 3 | | | | | | | | | | | | | 14 | |
|   | 100001 | 4 | 4 | 4 | 3 | | | | | | | | | | | | | 15 | |
|   | 100010 | 4 | 4 | 4 | 4 | | | | | | | | | | | | | 16 | |

COMMUNICATIONS IN SPATIAL STREAMS

CROSS REFERENCE TO RELATED APPLICATION

This is a continuation of U.S. application Ser. No. 16/296,711, filed Mar. 8, 2019, now U.S. Pat. No. 10,873,383 issued on Dec. 22, 2020, which is hereby incorporated by reference.

BACKGROUND

A goal of successive generations of radio frequency communications systems is to apply techniques that can increase the amount of information transmitted using communication resources as compared to prior techniques. In some examples, multiple-input and multiple-output (MIMO) communications can be employed. A MIMO communication refers to a wireless communication in which multiple signals can be transmitted over one or more transmission resources by exploiting multipath propagation. The multipath propagation uses multiple spatial streams that carry respective signals over the transmission resource.

In some cases, the number of spatial streams that can be used in a wireless network can be restricted, such as by a governing wireless communication standard. Restricting the number of spatial streams can result in the wireless network not being able to support communication demands of wireless devices. Accordingly, there is a desire to increase the number of available spatial streams while maintaining an acceptable level of signaling overhead.

SUMMARY

According to aspects of the present disclosure, a wireless network that supports multi-user multiple-input and multiple-output (MU-MIMO) communications can support up to 16 spatial streams for communicating with multiple wireless devices. At least one spatial stream from the 16 spatial streams are allocated to a plurality of wireless devices, such that no wireless device of the plurality of wireless devices is allocated more than 4 spatial streams. A control information element indicating the allocation of the at least one spatial stream is sent to the plurality of wireless devices.

According to an aspect of the present disclosure, there is provided a first wireless device comprising a network interface capable of communicating using 16 spatial streams, and at least one processor configured to allocate at least one spatial stream of the 16 spatial streams to a plurality of wireless devices, such that no wireless device of the plurality of wireless devices is allocated more than 4 spatial streams, and send a control information element indicating the allocation of the at least one spatial stream to the plurality of wireless devices.

According to another aspect of the present disclosure, there is provided a method performed by a first wireless device, the method comprising allocating at least one spatial stream of 16 available spatial streams to a plurality of wireless devices in a wireless network, such that no wireless device of the plurality of wireless devices is allocated more than 4 spatial streams, and sending a control information element indicating the allocation of spatial streams of the at least one spatial stream to the plurality of wireless devices.

According to a further aspect of the present disclosure, there is provided a first wireless device comprising a network interface capable of communicating over a plurality of spatial streams, and a non-transitory storage medium to store a spatial configuration data structure comprising a plurality of entries representing different allocations of spatial streams to a plurality of wireless devices, wherein none of the different allocations of spatial streams allocates more than 4 spatial streams to a wireless device. At least one processor is configured to receive, from a second wireless device, a control information element that maps to an entry of the plurality of entries, the entry mapped by the control information element comprising an allocation of spatial streams to at least some of the plurality of wireless devices.

According to yet another aspect of the present disclosure, there is provided a method performed by a first wireless device, the method comprising storing, in a storage medium, a spatial configuration data structure comprising a plurality of entries representing different allocations of spatial streams to a plurality of wireless devices, wherein none of the different allocations of spatial streams allocates more than 4 spatial streams to a wireless device, and receiving, from a second wireless device, a control information element that maps to an entry of the plurality of entries, the entry mapped by the control information element comprising an allocation of spatial streams to at least some of the plurality of wireless devices.

Optionally, in any of the preceding aspects, in another implementation, the control information element comprises a value of a six-bit index that maps to a respective spatial configuration.

Optionally, in any of the preceding aspects, in another implementation, a non-transitory storage medium is to store a spatial configuration table, wherein the spatial configurations are represented by different entries of the spatial configuration table.

Optionally, in any of the preceding aspects, in another implementation, the control information element further indicates how many wireless devices are allocated spatial streams.

Optionally, in any of the preceding aspects, in another implementation, the control information element is part of a preamble of a physical data unit.

Optionally, in any of the preceding aspects, in another implementation, the control information element is part of a signal (SIG) field in a physical header of a wireless local area network (WLAN) frame.

Optionally, in any of the preceding aspects, in another implementation, the control information element includes a user specific field of the SIG field, the user specific field further comprising a value indicating the allocation, and an identifier of a wireless device of the plurality of wireless devices.

Optionally, in any of the preceding aspects, in another implementation, the control information element includes a common field of the SIG field, the common field comprising a value indicating how many wireless devices are allocated spatial streams.

Optionally, in any of the preceding aspects, in another implementation, the first wireless device is able to communicate over the spatial streams with up to a maximum of 16 wireless devices.

Optionally, in any of the preceding aspects, in another implementation, the first wireless device is an access point (AP).

Optionally, in any of the preceding aspects, in another implementation, the network interface is to perform multi-user multiple-input and multiple-output (MU-MIMO) communications using up to the 16 spatial streams.

Optionally, in any of the preceding aspects, in another implementation, a value is sent indicating how many wireless devices are allocated spatial streams.

Optionally, in any of the preceding aspects, in another implementation, the control information element comprises a six-bit index that maps to the entry of the spatial configuration data structure.

Optionally, in any of the preceding aspects, in another implementation, the control information element indicates how many wireless devices are allocated spatial streams, and the indication of how many wireless devices are allocated spatial streams maps to the entry of the spatial configuration data structure.

Optionally, in any of the preceding aspects, in another implementation, the control information element comprises a six-bit index that in combination with the indication of how many wireless devices are allocated spatial streams maps to the entry of the spatial configuration data structure.

BRIEF DESCRIPTION OF THE DRAWINGS

Some implementations of the present disclosure are described with respect to the following figures.

Figure 3B:
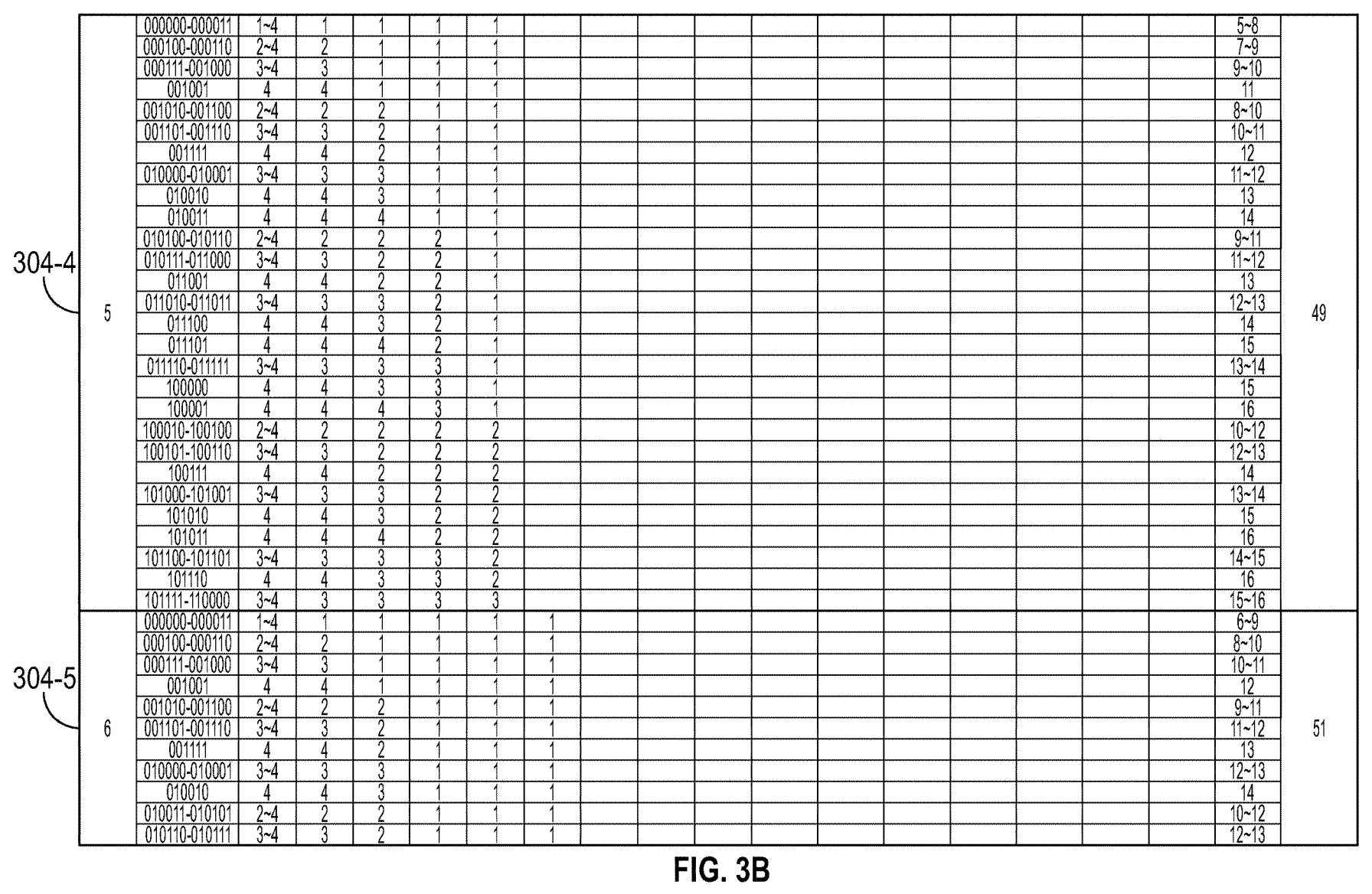
Figure 3C:
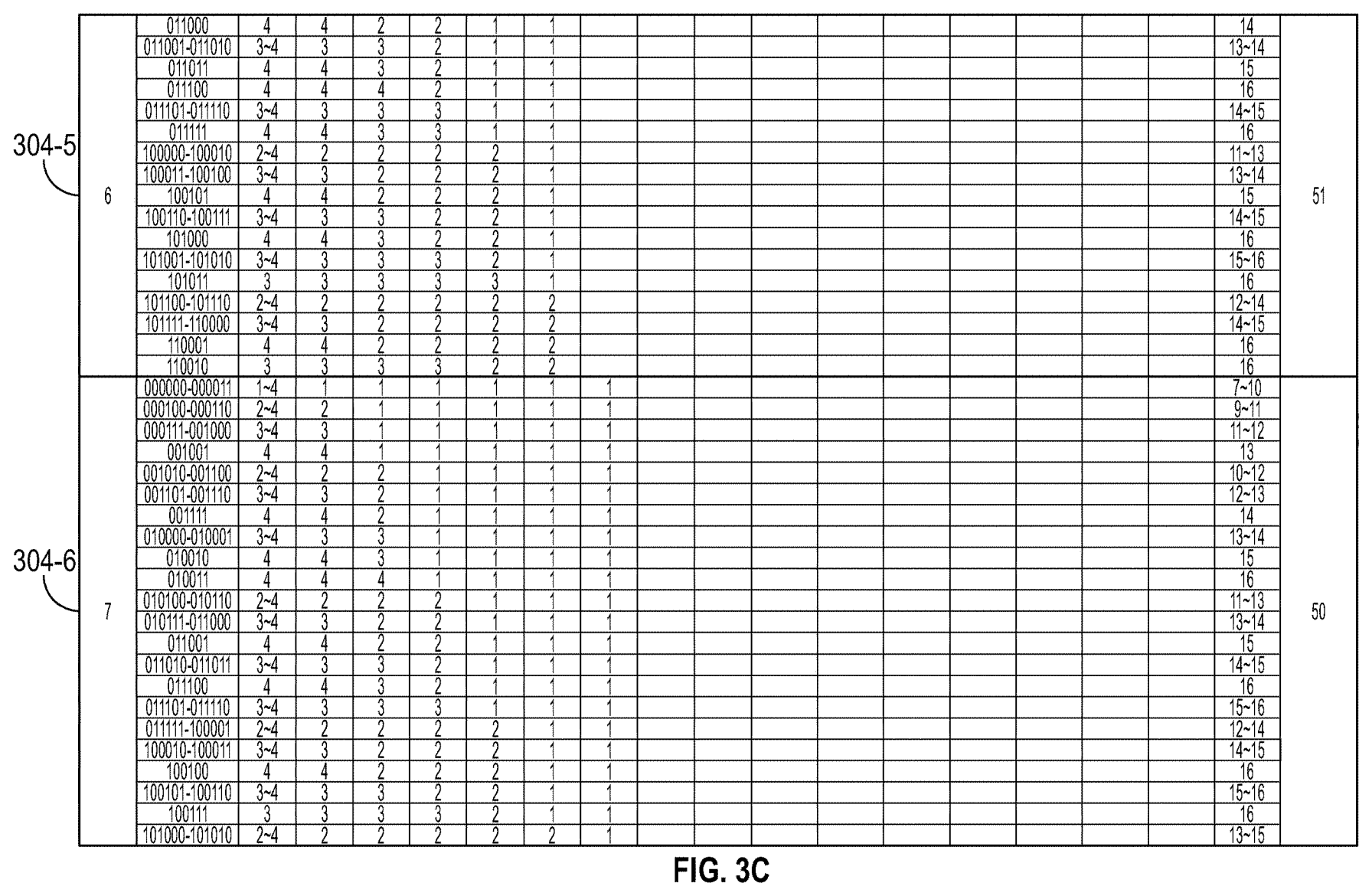
Figure 3D:
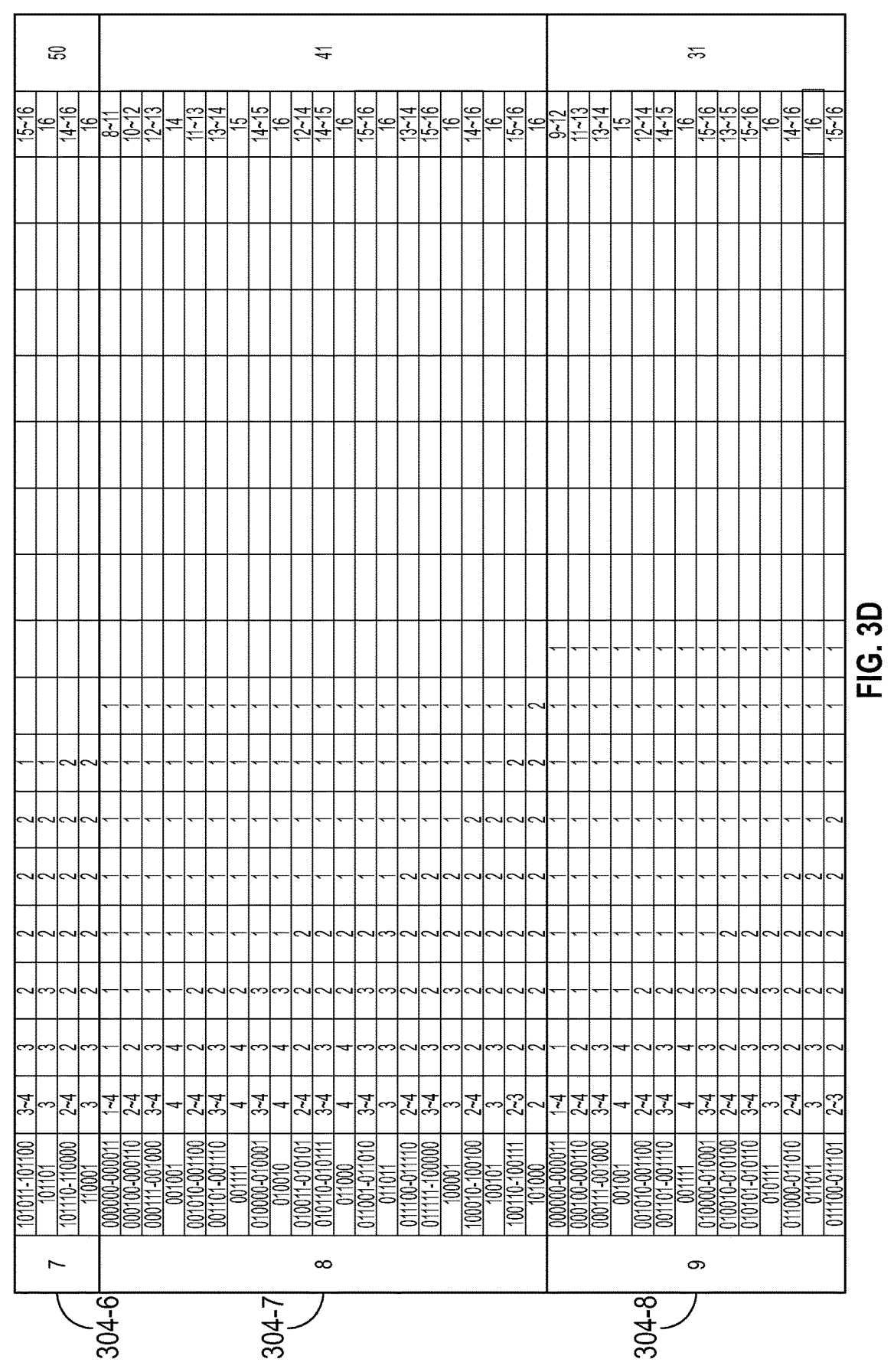
Figure 3E:
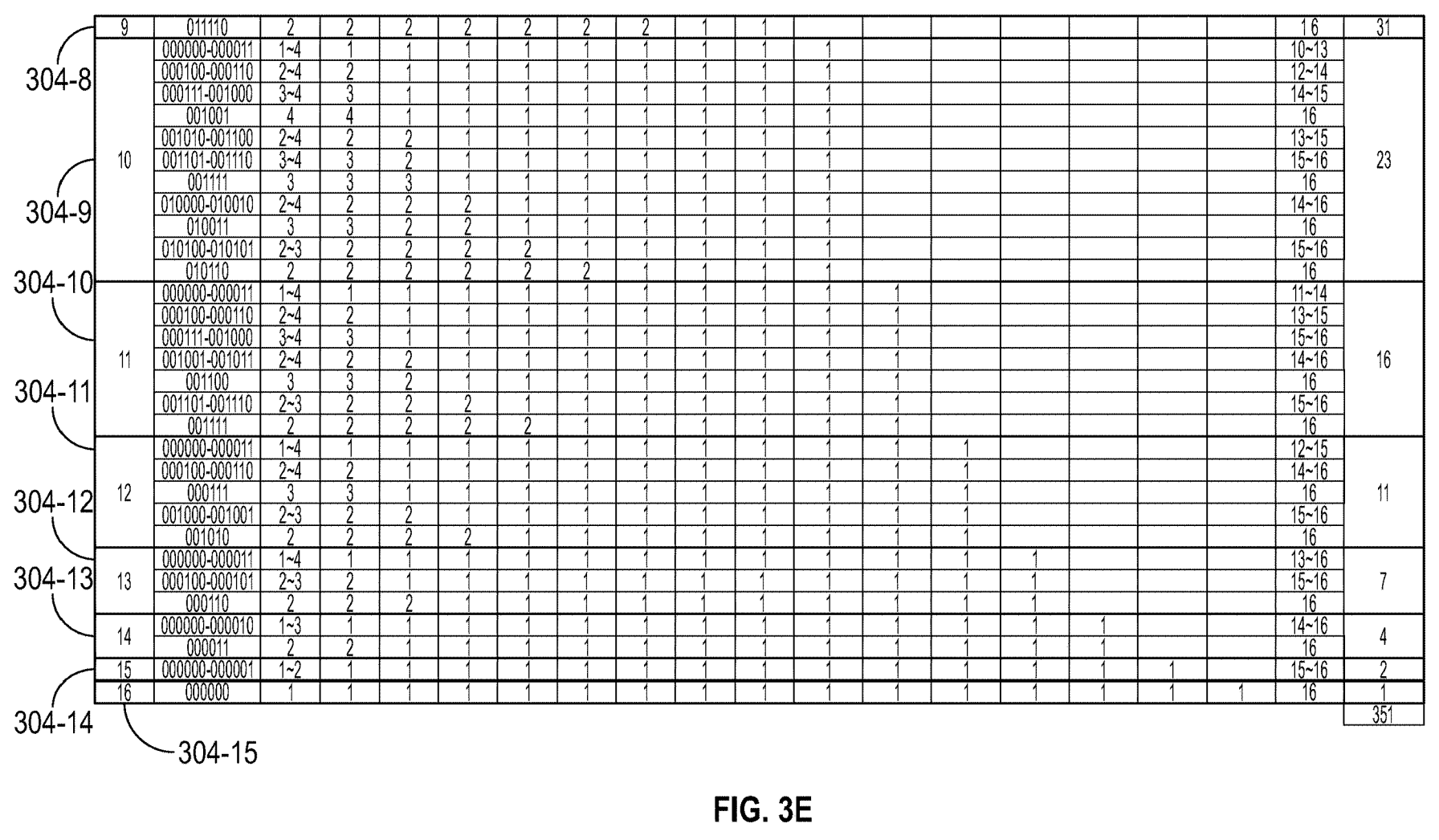

FIGS. 3A-3E illustrate an example spatial configuration table, according to some implementations.

Figure 1:
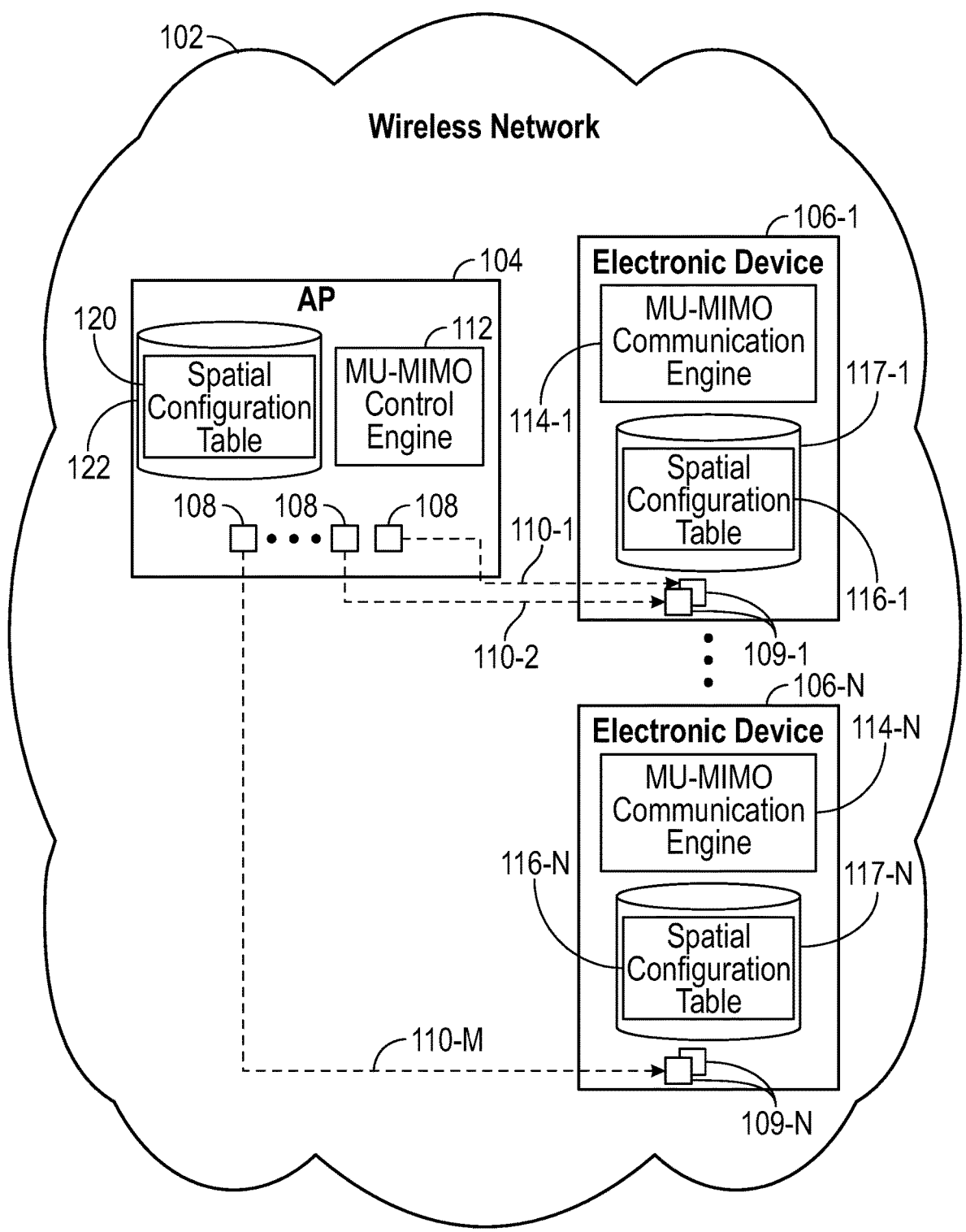
FIG. 1 is a block diagram of an example wireless arrangement that includes wireless devices capable of communications in spatial streams, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Multi-user multiple-input and multiple-output (MU-MIMO) refers to a wireless communication technology that supports wireless communication among multiple wireless devices using multiple spatial streams. The spatial streams are spatially distributed from one another. A source wireless device can transmit signals in the spatial streams to multiple recipient wireless devices. The different spatial streams can carry information that is modulated or coded differently. For example, the information carried in a first spatial stream is modulated or coded differently than information in a second spatial stream.

The throughput available for wireless communications using the spatial streams depends on the number of spatial streams that can be used for wireless communications. The Institute of Electrical and Electronics Engineers (IEEE) 802.11ax standard supports an MU-MIMO spatial configuration that allows for up to eight spatial streams to be used. Restricting the number of spatial streams to eight for MU-MIMO communications may result in a wireless network not being able to meet communication demands of wireless devices, as the number of wireless devices that are able to communicate in the wireless network continues to grow.

In accordance with some implementations of the present disclosure, an MU-MIMO spatial configuration is provided that supports up to 16 spatial streams for wireless communications. FIG. 1 is a block diagram of an example wireless arrangement in which an access point (AP) 104 is able to communicate with various electronic devices 106-1 to 106-N, N≥2, in a wireless network 102.

The AP 104 and the electronic devices 106-1 to 106-N are examples of wireless devices that are able to perform wireless communications.

In some examples, the AP 104 and electronic devices 106-1 to 106-N are able to communicate according to the Institute of Electrical and Electronic Engineers (IEEE) 802.11 group of standards. In such examples, the wireless network 102 is referred to as a wireless local area network (WLAN).

In other examples, the AP 104 and electronic devices 106-1 to 106-N can communicate according to other standards, such as wireless standards including a Long-Term Evolution (LTE) standard as promulgated by the Third Generation Partnership Project (3GPP). In further examples, a wireless standard can include a Fifth Generation (5G) 3GPP wireless standard. In a wireless network, an AP is referred to as a base station, such as an Evolved NodeB (eNB) for LTE.

Although just one AP 104 is shown in FIG. 1, it is noted that the wireless network 102 can include multiple APs that define respective coverage areas for communicating with electronic devices.

Examples of the electronic devices 106-1 and 106-2 include any or some combination of the following: a desktop computer, a notebook computer, a tablet computer, a smartphone, an Internet-of-Things (IoT) device (e.g., a sensor, a camera, a thermostat, a household appliance, etc.), a wearable device (e.g., a smartwatch, smart eyeglasses, a head-mounted device, etc.), a vehicle, server computers, storage devices, communication nodes, and so forth.

The AP 104 includes multiple transceivers 108 that are able to communicate with the electronic devices 106-1 to 106-N over corresponding spatial streams 110-1, 110-2, . . . , 110-M. Generally, M is greater than or equal to 2. In the example of FIG. 1, the AP 104 communicates over multiple spatial streams 110-1 and 110-2 with respective transceivers 109-1 the electronic device 106-1. The AP 104 communicates over a spatial stream 110-M with a transceiver 109-N of the electronic device 106-N. A "transceiver" includes a transmitter to transmit wireless signals, and a receiver to receive wireless signals. The transceiver can include an antenna and associated amplification and modulation/demodulation circuitry. Each electronic device 106-$i$ ($i$=1 to N) includes one or more transceivers 109-$i$.

In some examples, communications in the wireless network 102 between the AP 104 and the electronic devices 106-1 to 106-N can employ orthogonal frequency-division multiple access (OFDMA) channels. According to some wireless standards, such as the IEEE 802.11ax standard, an OFDMA channel is subdivided into multiple resource units (RUs). The different RUs of an OFDMA channel includes subcarriers of different frequencies. Each RU is a subchannel of the OFDMA channel. Although reference is made to IEEE 802.11ax, it is noted that techniques or mechanisms according to some implementations of the present disclosure can be used in conjunction with other standards, including future generations of the IEEE 802.11 standards or different standards.

In examples in which OFDMA RUs are used, the AP 104 can schedule MU-MIMO communications on one or more RUs. In other examples, MU-MIMO can be scheduled on other types of wireless transmission resources.

In accordance with some implementations of the present disclosure, the AP 104 is able to use an MU-MIMO spatial configuration that supports wireless communications with electronic devices over up to a maximum of 16 spatial streams. A cap of a maximum of four spatial streams for wireless communication is set for each electronic device 106-$i$ ($i$=1 to N). Stated differently, the number of spatial streams used by the AP 104 for communicating with an individual electronic device 106-$i$ does not exceed four spatial streams. Restricting the number of spatial streams that can be used with an individual electronic device to four spatial streams allows for improved MU-MIMO communication performance as compared to examples where more than four spatial streams can be scheduled for an individual electronic device.

Using 16 spatial streams as compared to eight spatial streams in a wireless network can improve communication throughput of wireless devices over the spatial streams, because a larger number of spatial streams can be divided among the wireless devices for use in data communications. With the increased number of spatial streams from eight to 16, the number of permutations of unique allocations of spatial streams to wireless devices increases significantly. The spatial stream allocation permutations include allocations of different numbers of spatial streams to respective wireless devices, which can vary depending upon the number of wireless devices to which the spatial streams are to be allocated.

With the large number of spatial stream allocation permutations, overhead associated with managing the allocation of spatial streams to wireless devices can increase. For example, signaling overhead can be increased due to use of an information element with a large number of bits to represent which permutation to use. Additionally, storage overhead can be increased if a data structure (referred to as a "spatial configuration table" in some examples and discussed further below) stored in a memory or other storage medium includes entries corresponding to all of the possible spatial stream allocation permutations.

By restricting the number of spatial streams that can be allocated to each wireless device to four, the number of spatial stream allocation permutations can be reduced. Reducing the number of spatial stream allocation permutations allows for use of an information element with a smaller number of bits to represent the different spatial stream allocations (as compared to the case where all of the possible spatial stream allocation permutations have to be signaled). Also, reducing the number of spatial stream allocation permutations means that the data structure storing entries representing the different spatial stream allocations is smaller than the case where the data structure includes entries corresponding to all of the possible spatial stream allocation permutations.

The AP 104 includes an MU-MIMO control engine 112 that is able to control the scheduling of spatial streams for use with a collection of electronic devices. Each electronic device 106-1 to 106-N includes a respective MU-MIMO communication engine 114-1 to 114-N that is able to interact with the MU-MIMO control engine 112 for performing MU-MIMO communications with the AP 104 over spatial streams allocated to the respective electronic device 106-$i$.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The MU-MIMO control engine 112 is able to send a control information element to each respective electronic device 106-$i$ for controlling an allocation of one or more spatial streams to the electronic device 106-$i$. An "information element" can refer to a message, a portion of a message, or any other collection of information. The control information element can also include multiple portions (e.g., fields) of a message, or multiple messages. The control information element can be broadcast or multicast by the AP 104 to multiple electronic devices. Alternatively, the control information element can be unicast by the AP 104 to an individual electronic device.

The MU-MIMO communication engine 114-$i$ in the respective electronic device 106-$i$ can receive the control information element, and determine an allocation of spatial streams for the electronic device 106-I based on the control information element. Note that the allocated spatial streams can include just one spatial stream or multiple spatial streams, up to a maximum of four spatial streams.

In some examples, the control information element includes a spatial configuration table index that can be set to one of multiple different values to correspond to different entries of a spatial configuration table. As shown in FIG. 1, the electronic devices 106-1 to 106-N store respective spatial configuration tables 116-1 to 116-N. Each spatial configuration table 116-$i$ is stored in a respective storage medium 117-$i$ of the corresponding electronic device 106-$i$.

The AP 104 also stores its copy of the spatial configuration table 120 in a storage medium 122 of the AP 104. A storage medium in the AP 104 or an electronic device 106-$i$ can include one or more storage devices, including any or some combination of a disk-based storage device, a solid-state drive, a memory device, and so forth.

In some implementations of the present disclosure, the spatial configuration table index is six bits in length. The spatial configuration table index can be set to six bits in length because the number of spatial stream allocation permutations has been reduced based on capping the number of spatial streams to each wireless device to a maximum of four. Without capping the number of spatial streams to each wireless device to a maximum of four, a six-bit spatial configuration table index would not be sufficient to represent all of the possible spatial configuration allocation permutations.

The control information element sent by the AP 104 can also include a parameter set to a value that identifies a number of electronic devices that are participating in MU-MIMO communications. As used here, a "number" of electronic devices refers to a quantity of electronic devices, i.e., how many electronic devices have been allocated spatial streams. The combination of the number of electronic devices and the spatial configuration table index included in the control information element maps to a respective entry of the spatial configuration table. The MU-MIMO communication engine 114-*i* of each electronic device 106-*i* participating in the MU-MIMO communications accesses the respective entry of the spatial configuration table to determine the respective allocation of spatial streams to that electronic device 106-*i*.

Figure 2:
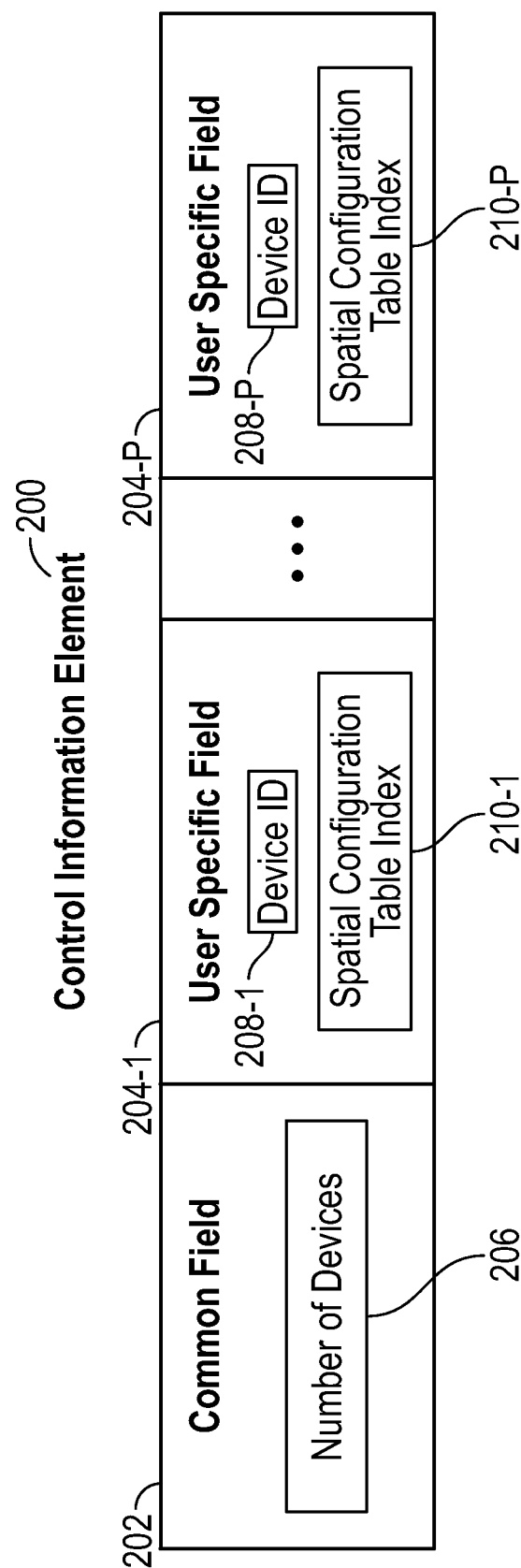
FIG. 2 is a block diagram of a control information element, according to some examples.

FIG. 2 illustrates an example control information element 200. In some examples, the control information element 200 can be in the form of a signal (SIG) field in a physical (PHY) header of a WLAN frame. In other examples, the control information element 200 can be part of a different field or different message (or part of multiple fields or messages). For example, the control information element 200 can be part of the preamble of a physical data unit.

The control information element 200 includes a common field 202 and one or more user-specific fields 204-1 to 204-P (P≥2 in examples in which the control information element 200 includes more than one user-specific field). The common field 202 can include a parameter 206 set to a value that specifies a number of electronic devices being scheduled for MU-MIMO communications. For example, up to 16 electronic devices can be scheduled for MU-MIMO communications by the AP 104.

Each user-specific field 204-*j* (j=1 to P) includes information specific to a respective individual electronic device. A user-specific field 204-*j* includes a device identifier 208-*j* (such as a station or STA identifier) to identify the respective electronic device. In addition, the user-specific field 204-*j* includes a spatial configuration table index 210-*j* (six bits in length in some implementations) that in combination with the parameter 206 maps to a respective entry of the spatial configuration table. The user-specific field 204-*j* can include further information in further examples.

In the example of FIG. 2, the user-specific field 204-*j* contains information specific to the electronic device identified by the device ID 208-*j* in the user-specific field 204-*j*.

An example of a spatial configuration table 300 according to some implementations of the present disclosure is shown in FIGS. 3A-3E. An instance of the spatial configuration table 300 can be stored in the AP 104 and in each of the electronic devices 106-1 to 106-N.

In the spatial configuration table 300, an N_STA column 302 includes a value of the parameter 206 (FIG. 2) included in the common field 202 for specifying the number of electronic devices being scheduled for MU-MIMO communications. Different values of N_STA map to different spatial configuration table parts (304-1 to 304-15) of the spatial configuration table 300. The spatial configuration table part 304-1 of the spatial configuration table 300 contains entries for a scenario in which two electronic devices are scheduled for MU-MIMO communications, the spatial configuration table part 304-2 of the spatial configuration table 300 contains entries for a scenario in which three electronic devices are scheduled for MU-MIMO communications, the spatial configuration table part 304-3 of the spatial configuration table 300 contains entries for a scenario in which four electronic devices are scheduled for MU-MIMO communications, and so forth, up to the spatial configuration table part 304-15 of the spatial configuration table 300 that contains entries for a scenario in which 16 electronic devices are scheduled for MU-MIMO communications.

An index column 306 includes different values of the spatial configuration table index, implemented with six bits B5, B4, B3, B2, B1, B0.

An Nsts(1) column specifies the number of spatial streams allocated to electronic device 1, an Nsts(2) column specifies the number of spatial streams allocated to electronic device 2, an Nsts(3) specifies the number of spatial streams allocated to electronic device 3, and so forth, up to an Nsts(16) column, which specifies the number of spatial streams allocated to electronic device 16. Note that a blank in a given Nsts(i) column indicates that the allocation of spatial streams in the corresponding entry of the spatial configuration table 300 does not apply to the corresponding electronic device i (i=1 to 16).

A Total N_STS column of the spatial configuration table 300 indicates a number of spatial streams allocated to MU-MIMO scheduled electronic devices. A Number of Entries column specifies the number of entries present in the respective part of the spatial configuration table 300. For example, the Number of Entries value for the spatial configuration table part 304-1 is 10, which indicates that the spatial configuration table part 304-1 includes 10 entries corresponding to 10 possible values (000000 to 001001) of the spatial configuration table index included in the index column 306.

In the spatial configuration table part 304-1 corresponding to N_STA=2, the range of index values of the spatial configuration table index is 000000 to 001001.

The four possible values (000000, 000001, 000010, and 000011) in the spatial configuration table index range of 000000-000011 correspond to respective different numbers of spatial streams allocated to electronic device 1. For example, if the spatial configuration table index is set to 000000, and N_STA=2, then the number of spatial streams allocated to electronic device 1 in the Nsts(1) column is 1 and the number of spatial streams allocated to electronic device 2 in the Nsts(2) column is 1 (note that in this entry of the spatial configuration table 300, the other electronic devices 3 to 16 are not allocated any spatial streams). If the spatial configuration table index is set to 000001 and the N_STA=2, then the number of spatial streams allocated to electronic device 1 in the Nsts(1) column is 2 and the number of spatial streams allocated to electronic device 2 in the Nsts(2) column is 1 (note that in this entry of the spatial configuration table 300, the other electronic devices 3 to 16 are not allocated any spatial streams). If the spatial configuration table index is set to 000010 and N_STA=2, then the number of spatial streams allocated to electronic device 1 in the Nsts(1) column is 2 and the number of spatial streams allocated to electronic device 2 in the Nsts(2) column is 1 (note that in this entry of the spatial configuration table 300, the other electronic devices 3 to 16 are not allocated any spatial streams). If the spatial configuration table index is set to 000011 and N_STA=2, then the number of spatial streams allocated to electronic device 1 in the Nsts(1) column is 4 and the number of spatial streams allocated to electronic device 2 in the Nsts(2) column is 1 (note that in this entry of the spatial configuration table 300, the other electronic devices 3 to 16 are not allocated any spatial streams).

If the spatial configuration table index is set to 000100 and N_STA=2, then the number of spatial streams allocated to electronic device 1 in the Nsts(1) column is 2 and the number of spatial streams allocated to electronic device 2 in the Nsts(2) column is 2 (note that in this entry of the spatial configuration table 300, the other electronic devices 3 to 16 are not allocated any spatial streams).

The other entries of the spatial configuration table part 304-1 are construed similarly.

In another example for N_STA=4 (which maps to the spatial configuration table part 304-3), if the spatial configuration table index is set to 001111, then the number of spatial streams allocated to electronic device 1 in the Nsts(1) column is 4, the number of spatial streams allocated to electronic device 2 in the Nsts(2) column is 4, the number of spatial streams allocated to electronic device 3 in the Nsts(3) column is 2, and the number of spatial streams allocated to electronic device 4 in the Nsts(4) column is 1 (note that in this entry of the spatial configuration table 300, the other electronic devices 5 to 16 are not allocated any spatial streams).

The remainder of the spatial configuration table 300 is construed similarly.

In the example of FIG. 3, certain combinations of N_STA values and spatial configuration table index values map to spatial configurations in which more than eight and up to 16 spatial streams are allocated to electronic devices.

A reduced version of a spatial configuration table is set forth below, where rows and columns for a number of electronic devices greater than 8 have been removed.

| N_STA | B5...B0 | Nsts(1) | Nsts(2) | Nsts(3) | Nsts(4) | Nsts(5) | Nsts(6) | Nsts(7) | Nsts(8) | Total N_STS | Number of Entries |
|---|---|---|---|---|---|---|---|---|---|---|---|
| 2 | 000000-000011 | 1~4 | 1 | | | | | | | 2~5 | 10 |
|   | 000100-000110 | 2~4 | 2 | | | | | | | 4~6 | |
|   | 000111-001000 | 3~4 | 3 | | | | | | | 6~7 | |
|   | 001001 | 4 | 4 | | | | | | | 8 | |
| 3 | 000000-000011 | 1~4 | 1 | 1 | | | | | | 3~6 | 20 |
|   | 000100-000110 | 2~4 | 2 | 1 | | | | | | 5~7 | |
|   | 000111-001000 | 3~4 | 3 | 1 | | | | | | 7~8 | |
|   | 001001 | 4 | 4 | 1 | | | | | | 9 | |
|   | 001010-001100 | 2~4 | 2 | 2 | | | | | | 6~8 | |
|   | 001101-001110 | 3~4 | 3 | 2 | | | | | | 8~9 | |
|   | 001111 | 4 | 4 | 2 | | | | | | 10 | |
|   | 010000-010001 | 3~4 | 3 | 3 | | | | | | 9~10 | |
|   | 010010 | 4 | 4 | 3 | | | | | | 11 | |
|   | 010011 | 4 | 4 | 4 | | | | | | 12 | |
| 4 | 000000-000011 | 1~4 | 1 | 1 | 1 | | | | | 4~7 | 35 |
|   | 000100-000110 | 2~4 | 2 | 1 | 1 | | | | | 6~8 | |
|   | 000111-001000 | 3~4 | 3 | 1 | 1 | | | | | 8~9 | |
|   | 001001 | 4 | 4 | 1 | 1 | | | | | 10 | |
|   | 001010-001100 | 2~4 | 2 | 2 | 1 | | | | | 7~9 | |
|   | 001101-001110 | 3~4 | 3 | 2 | 1 | | | | | 9~10 | |
|   | 001111 | 4 | 4 | 2 | 1 | | | | | 11 | |
|   | 010000-010001 | 3~4 | 3 | 3 | 1 | | | | | 10~11 | |
|   | 010010 | 4 | 4 | 3 | 1 | | | | | 12 | |
|   | 010011 | 4 | 4 | 4 | 1 | | | | | 13 | |
|   | 010100-010110 | 2~4 | 2 | 2 | 2 | | | | | 8~10 | |
|   | 010111-011000 | 3~4 | 3 | 2 | 2 | | | | | 10~11 | |
|   | 011001 | 4 | 4 | 2 | 2 | | | | | 12 | |
|   | 011010-011011 | 3~4 | 3 | 3 | 2 | | | | | 11~12 | |
|   | 011100 | 4 | 4 | 3 | 2 | | | | | 13 | |
|   | 011101 | 4 | 4 | 4 | 2 | | | | | 14 | |
|   | 011110-011111 | 3~4 | 3 | 3 | 3 | | | | | 12~13 | |
|   | 100000 | 4 | 4 | 3 | 3 | | | | | 14 | |
|   | 100001 | 4 | 4 | 4 | 3 | | | | | 15 | |
|   | 100010 | 4 | 4 | 4 | 4 | | | | | 16 | |
| 5 | 000000-000011 | 1~4 | 1 | 1 | 1 | 1 | | | | 5~8 | 49 |
|   | 000100-000110 | 2~4 | 2 | 1 | 1 | 1 | | | | 7~9 | |
|   | 000111-001000 | 3~4 | 3 | 1 | 1 | 1 | | | | 9~10 | |
|   | 001001 | 4 | 4 | 1 | 1 | 1 | | | | 11 | |
|   | 001010-001100 | 2~4 | 2 | 2 | 1 | 1 | | | | 8~10 | |
|   | 001101-001110 | 3~4 | 3 | 2 | 1 | 1 | | | | 10~11 | |
|   | 001111 | 4 | 4 | 2 | 1 | 1 | | | | 12 | |
|   | 010000-010001 | 3~4 | 3 | 3 | 1 | 1 | | | | 11~12 | |
|   | 010010 | 4 | 4 | 3 | 1 | 1 | | | | 13 | |
|   | 010011 | 4 | 4 | 4 | 1 | 1 | | | | 14 | |
|   | 010100-010110 | 2~4 | 2 | 2 | 2 | 1 | | | | 9~11 | |
|   | 010111-011000 | 3~4 | 3 | 2 | 2 | 1 | | | | 11~12 | |
|   | 011001 | 4 | 4 | 2 | 2 | 1 | | | | 13 | |
|   | 011010-011011 | 3~4 | 3 | 3 | 2 | 1 | | | | 12~13 | |
|   | 011100 | 4 | 4 | 3 | 2 | 1 | | | | 14 | |
|   | 011101 | 4 | 4 | 4 | 2 | 1 | | | | 15 | |
|   | 011110-011111 | 3~4 | 3 | 3 | 3 | 1 | | | | 13~14 | |
|   | 100000 | 4 | 4 | 3 | 3 | 1 | | | | 15 | |
|   | 100001 | 4 | 4 | 4 | 3 | 1 | | | | 16 | |
|   | 100010-100100 | 2~4 | 2 | 2 | 2 | 2 | | | | 10~12 | |
|   | 100101-100110 | 3~4 | 3 | 2 | 2 | 2 | | | | 12~13 | |
|   | 100111 | 4 | 4 | 2 | 2 | 2 | | | | 14 | |
|   | 101000-101001 | 3~4 | 3 | 3 | 2 | 2 | | | | 13~14 | |
|   | 101010 | 4 | 4 | 3 | 2 | 2 | | | | 15 | |
|   | 101011 | 4 | 4 | 4 | 2 | 2 | | | | 16 | |
|   | 101100-101101 | 3~4 | 3 | 3 | 3 | 2 | | | | 14~15 | |
|   | 101110 | 4 | 4 | 3 | 3 | 2 | | | | 16 | |
|   | 101111-110000 | 3~4 | 3 | 3 | 3 | 3 | | | | 15~16 | |
| 6 | 000000-000011 | 1~4 | 1 | 1 | 1 | 1 | 1 | | | 6~9 | 54 |
|   | 000100-000110 | 2~4 | 2 | 1 | 1 | 1 | 1 | | | 8~10 | |
|   | 000111-001000 | 3~4 | 3 | 1 | 1 | 1 | 1 | | | 10~11 | |
|   | 001001 | 4 | 4 | 1 | 1 | 1 | 1 | | | 12 | |

-continued

| N_STA | B5 ... B0 | Nsts (1) | Nsts (2) | Nsts (3) | Nsts (4) | Nsts (5) | Nsts (6) | Nsts (7) | Nsts (8) | Total N_STS | Number of Entries |
|---|---|---|---|---|---|---|---|---|---|---|---|
|   | 001010-001100 | 2~4 | 2 | 2 | 1 | 1 | 1 |   |   | 9~11 |   |
|   | 001101-001110 | 3~4 | 3 | 2 | 1 | 1 | 1 |   |   | 11~12 |   |
|   | 001111 | 4 | 4 | 2 | 1 | 1 | 1 |   |   | 13 |   |
|   | 010000-010001 | 3~4 | 3 | 3 | 1 | 1 | 1 |   |   | 12~13 |   |
|   | 010010 | 4 | 4 | 3 | 1 | 1 | 1 |   |   | 14 |   |
|   | 010011-010101 | 2~4 | 2 | 2 | 2 | 1 | 1 |   |   | 10~12 |   |
|   | 010110-010111 | 3~4 | 3 | 2 | 2 | 1 | 1 |   |   | 12~13 |   |
|   | 011000 | 4 | 4 | 2 | 2 | 1 | 1 |   |   | 14 |   |
|   | 011001-011010 | 3~4 | 3 | 3 | 2 | 1 | 1 |   |   | 13~14 |   |
|   | 011011 | 4 | 4 | 3 | 2 | 1 | 1 |   |   | 15 |   |
|   | 011100 | 4 | 4 | 4 | 1 | 1 | 1 |   |   | 15 |   |
|   | 011101 | 4 | 4 | 4 | 2 | 1 | 1 |   |   | 16 |   |
|   | 011110-011111 | 3~4 | 3 | 3 | 3 | 1 | 1 |   |   | 14~15 |   |
|   | 100000 | 4 | 4 | 3 | 3 | 1 | 1 |   |   | 16 |   |
|   | 100001-100011 | 2~4 | 2 | 2 | 2 | 2 | 1 |   |   | 11~13 |   |
|   | 100100-100101 | 3~4 | 3 | 2 | 2 | 2 | 1 |   |   | 13~14 |   |
|   | 100110 | 4 | 4 | 2 | 2 | 2 | 1 |   |   | 15 |   |
|   | 100111-101000 | 3~4 | 3 | 3 | 2 | 2 | 1 |   |   | 14~15 |   |
|   | 101001 | 4 | 4 | 3 | 2 | 2 | 1 |   |   | 16 |   |
|   | 101010-101011 | 3~4 | 3 | 3 | 3 | 2 | 1 |   |   | 15~16 |   |
|   | 101100 | 3 | 3 | 3 | 3 | 3 | 1 |   |   | 16 |   |
|   | 101101-101111 | 2~4 | 2 | 2 | 2 | 2 | 2 |   |   | 12~14 |   |
|   | 110000-110001 | 3~4 | 3 | 2 | 2 | 2 | 2 |   |   | 14~15 |   |
|   | 110010 | 4 | 4 | 2 | 2 | 2 | 2 |   |   | 16 |   |
|   | 110011-110100 | 3~4 | 3 | 3 | 2 | 2 | 2 |   |   | 15~16 |   |
|   | 110101 | 3 | 3 | 3 | 3 | 2 | 2 |   |   | 16 |   |
| 7 | 000000-000011 | 1~4 | 1 | 1 | 1 | 1 | 1 | 1 |   | 7~10 | 50 |
|   | 000100-000110 | 2~4 | 2 | 1 | 1 | 1 | 1 | 1 |   | 9~11 |   |
|   | 000111-001000 | 3~4 | 3 | 1 | 1 | 1 | 1 | 1 |   | 11~12 |   |
|   | 001001 | 4 | 4 | 1 | 1 | 1 | 1 | 1 |   | 13 |   |
|   | 001010-001100 | 2~4 | 2 | 2 | 1 | 1 | 1 | 1 |   | 10~12 |   |
|   | 001101-001110 | 3~4 | 3 | 2 | 1 | 1 | 1 | 1 |   | 12~13 |   |
|   | 001111 | 4 | 4 | 2 | 1 | 1 | 1 | 1 |   | 14 |   |
|   | 010000-010001 | 3~4 | 3 | 3 | 1 | 1 | 1 | 1 |   | 13~14 |   |
|   | 010010 | 4 | 4 | 3 | 1 | 1 | 1 | 1 |   | 15 |   |
|   | 010011 | 4 | 4 | 4 | 1 | 1 | 1 | 1 |   | 16 |   |
|   | 010100-010110 | 2~4 | 2 | 2 | 2 | 1 | 1 | 1 |   | 11~13 |   |
|   | 010111-011000 | 3~4 | 3 | 2 | 2 | 1 | 1 | 1 |   | 13~14 |   |
|   | 011001 | 4 | 4 | 2 | 2 | 1 | 1 | 1 |   | 15 |   |
|   | 011010-011011 | 3~4 | 3 | 3 | 2 | 1 | 1 | 1 |   | 14~15 |   |
|   | 011100 | 4 | 4 | 3 | 2 | 1 | 1 | 1 |   | 16 |   |
|   | 011101-011110 | 3~4 | 3 | 3 | 3 | 1 | 1 | 1 |   | 15~16 |   |
|   | 011111-100001 | 2~4 | 2 | 2 | 2 | 2 | 1 | 1 |   | 12~14 |   |
|   | 100010-100011 | 3~4 | 3 | 2 | 2 | 2 | 1 | 1 |   | 14~15 |   |
|   | 100100 | 4 | 4 | 2 | 2 | 2 | 1 | 1 |   | 16 |   |
|   | 100101-100110 | 3~4 | 3 | 3 | 2 | 2 | 1 | 1 |   | 15~16 |   |
|   | 100111 | 3 | 3 | 3 | 3 | 2 | 1 | 1 |   | 16 |   |
|   | 101000-101010 | 2~4 | 2 | 2 | 2 | 2 | 2 | 1 |   | 13~15 |   |
|   | 101011-101100 | 3~4 | 3 | 2 | 2 | 2 | 2 | 1 |   | 15~16 |   |
|   | 101101 | 3 | 3 | 3 | 2 | 2 | 2 | 1 |   | 16 |   |
|   | 101110-110000 | 2~4 | 2 | 2 | 2 | 2 | 2 | 2 |   | 14~16 |   |
|   | 110001 | 3 | 3 | 2 | 2 | 2 | 2 | 2 |   | 16 |   |
| 8 | 000000-000011 | 1~4 | 1 | 1 | 1 | 1 | 1 | 1 | 1 | 8~11 | 41 |
|   | 000100-000110 | 2~4 | 2 | 1 | 1 | 1 | 1 | 1 | 1 | 10~12 |   |
|   | 000111-001000 | 3~4 | 3 | 1 | 1 | 1 | 1 | 1 | 1 | 12~13 |   |
|   | 001001 | 4 | 4 | 1 | 1 | 1 | 1 | 1 | 1 | 14 |   |
|   | 001010-001100 | 2~4 | 2 | 2 | 1 | 1 | 1 | 1 | 1 | 11~13 |   |
|   | 001101-001110 | 3~4 | 3 | 2 | 1 | 1 | 1 | 1 | 1 | 13~14 |   |
|   | 001111 | 4 | 4 | 2 | 1 | 1 | 1 | 1 | 1 | 15 |   |
|   | 010000-010001 | 3~4 | 3 | 3 | 1 | 1 | 1 | 1 | 1 | 14~15 |   |
|   | 010010 | 4 | 4 | 3 | 1 | 1 | 1 | 1 | 1 | 16 |   |
|   | 010011-010101 | 2~4 | 2 | 2 | 2 | 1 | 1 | 1 | 1 | 12~14 |   |
|   | 010110-010111 | 3~4 | 3 | 2 | 2 | 1 | 1 | 1 | 1 | 14~15 |   |
|   | 011000 | 4 | 4 | 2 | 2 | 1 | 1 | 1 | 1 | 16 |   |
|   | 011001-011010 | 3~4 | 3 | 3 | 2 | 1 | 1 | 1 | 1 | 15~16 |   |
|   | 011011 | 3 | 3 | 3 | 3 | 1 | 1 | 1 | 1 | 16 |   |
|   | 011100-011110 | 2~4 | 2 | 2 | 2 | 2 | 1 | 1 | 1 | 13~14 |   |
|   | 011111-100000 | 3~4 | 3 | 2 | 2 | 2 | 1 | 1 | 1 | 15~16 |   |
|   | 100001 | 3 | 3 | 3 | 3 | 2 | 1 | 1 | 1 | 16 |   |
|   | 100010-100100 | 2~4 | 2 | 2 | 2 | 2 | 2 | 1 | 1 | 14~16 |   |
|   | 100101 | 3 | 3 | 2 | 2 | 2 | 2 | 1 | 1 | 16 |   |
|   | 100110-100111 | 2~3 | 2 | 2 | 2 | 2 | 2 | 2 | 1 | 15~16 |   |
|   | 101000 | 2 | 2 | 2 | 2 | 2 | 2 | 2 | 2 | 16 |   |

Figure 4:
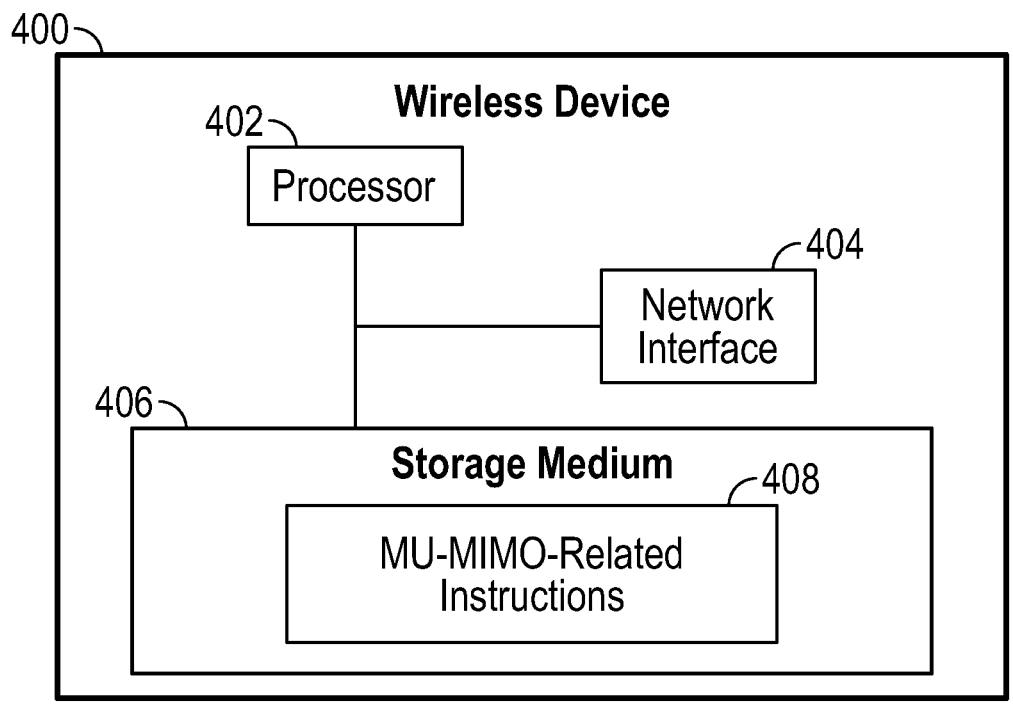
FIG. 4 is a block diagram of a wireless device according to some implementations of the present disclosure.

FIG. 4 is a block diagram of a wireless device 400, which can be the AP 104 of FIG. 1 or an electronic device 106-*i* of FIG. 1. The wireless device 400 includes one or more hardware processors 402. A hardware processor can include a microprocessor, a core of a multi-core microprocessor, a microcontroller, a programmable integrated circuit, a programmable gate array, a digital signal processor, or another hardware processing circuit.

The wireless device 400 further includes a network interface 404 to communicate over a wireless network (e.g., 102 in FIG. 1). The network interface 404 includes transceivers and network protocol layers to allow for communications over the wireless network.

The wireless device 400 also includes a non-transitory machine-readable or computer-readable storage medium 406 that stores machine-readable instructions executable on the one or more hardware processors 402 to perform respective tasks.

The machine-readable instructions include MU-MIMO-related instructions 408, which upon execution on the one or more hardware processors 402 can perform the tasks of the MU-MIMO control engine 112 of FIG. 1, or the tasks of the MU-MIMO communication engine 114-*i* of FIG. 1.

For example, the MU-MIMO-related instructions 408 can send a control information element including a value (e.g., of a spatial configuration table index) selected from multiple values that correspond to different spatial configurations (having different allocations of spatial streams) of the 16 spatial streams to multiple wireless devices. Each wireless device is allocated up to a maximum of four spatial streams. The spatial configuration table index can be a six-bit index.

Figure 5:
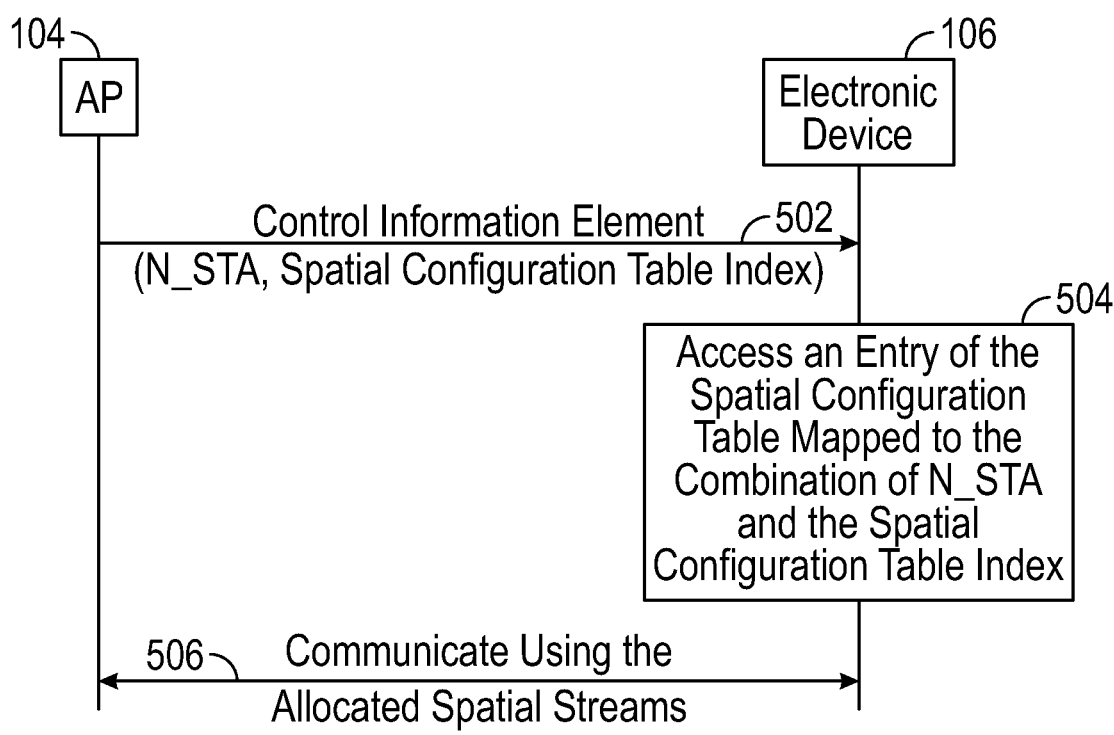
FIG. 5 is a message flow diagram of a process according to some implementations of the present disclosure.

FIG. 5 is a flow diagram of a process that can be performed by the AP 104 and an electronic device 106, according to some examples. The AP transmits (at 502) a control information element that includes an N_STA parameter (specifying a number of electronic devices involved in scheduling for MU-MIMO communications by the AP 104) and a spatial configuration table index.

In response to receiving the control information element, the electronic device 106 accesses (at 504) an entry of the spatial configuration table (e.g., 300 in FIG. 3) stored in the electronic device 106. The accessed entry of the spatial configuration table is mapped to a combination of the N_STA parameter value and the spatial configuration table index. The accessed entry includes an allocation of spatial streams (one or more) for the electronic device 106.

The electronic device 106 uses the allocated spatial stream(s), as indicated by the accessed entry of the spatial configuration table, to communicate (at 506) with the AP 104. For example, the electronic device 106 receives information in the allocated spatial stream(s) from the AP 104.

A storage medium (e.g., 406 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A first wireless device comprising:
a network interface capable of communicating using 16 spatial streams; and
at least one processor configured to:
allocate at least one spatial stream of the 16 spatial streams to a plurality of wireless devices, such that no wireless device of the plurality of wireless devices is allocated more than 4 spatial streams, and
send a control information element indicating allocation of the at least one spatial stream to the plurality of wireless devices, wherein the control information element comprises a value of a six-bit index that maps to a respective spatial configuration of different spatial configurations of a spatial configuration table, wherein the different spatial configurations correspond to different allocations of spatial streams to the plurality of wireless devices, and the spatial configuration table comprises:

| N_STA | B5...B0 | Nsts (1) | Nsts (2) | Nsts (3) | Nsts (4) | Nsts (5) | Nsts (6) | Nsts (7) | Nsts (8) | Total N_STS | Number of Entries |
|---|---|---|---|---|---|---|---|---|---|---|---|
| 2 | 000000-000011 | 1~4 | 1 | | | | | | | 2~5 | 10 |
|   | 000100-000110 | 2~4 | 2 | | | | | | | 4~6 | |
|   | 000111-001000 | 3~4 | 3 | | | | | | | 6~7 | |
|   | 001001 | 4 | 4 | | | | | | | 8 | |
| 3 | 000000-000011 | 1~4 | 1 | 1 | | | | | | 3~6 | 20 |
|   | 000100-000110 | 2~4 | 2 | 1 | | | | | | 5~7 | |
|   | 000111-001000 | 3~4 | 3 | 1 | | | | | | 7~8 | |
|   | 001001 | 4 | 4 | 1 | | | | | | 9 | |
|   | 001010-001100 | 2~4 | 2 | 2 | | | | | | 6~8 | |
|   | 001101-001110 | 3~4 | 3 | 2 | | | | | | 8~9 | |
|   | 001111 | 4 | 4 | 2 | | | | | | 10 | |
|   | 010000-010001 | 3~4 | 3 | 3 | | | | | | 9~10 | |

-continued

| N_STA | B5...B0 | Nsts (1) | Nsts (2) | Nsts (3) | Nsts (4) | Nsts (5) | Nsts (6) | Nsts (7) | Nsts (8) | Total N_STS | Number of Entries |
|---|---|---|---|---|---|---|---|---|---|---|---|
| | 010010 | 4 | 4 | 3 | | | | | | 11 | |
| | 010011 | 4 | 4 | 4 | | | | | | 12 | |
| 4 | 000000-000011 | 1~4 | 1 | 1 | 1 | | | | | 4~7 | 35 |
| | 000100-000110 | 2~4 | 2 | 1 | 1 | | | | | 6~8 | |
| | 000111-001000 | 3~4 | 3 | 1 | 1 | | | | | 8~9 | |
| | 001001 | 4 | 4 | 1 | 1 | | | | | 10 | |
| | 001010-001100 | 2~4 | 2 | 2 | 1 | | | | | 7~9 | |
| | 001101-001110 | 3~4 | 3 | 2 | 1 | | | | | 9~10 | |
| | 001111 | 4 | 4 | 2 | 1 | | | | | 11 | |
| | 010000-010001 | 3~4 | 3 | 3 | 1 | | | | | 10~11 | |
| | 010010 | 4 | 4 | 3 | 1 | | | | | 12 | |
| | 010011 | 4 | 4 | 4 | 1 | | | | | 13 | |
| | 010100-010110 | 2~4 | 2 | 2 | 2 | | | | | 8~10 | |
| | 010111-011000 | 3~4 | 3 | 2 | 2 | | | | | 10~11 | |
| | 011001 | 4 | 4 | 2 | 2 | | | | | 12 | |
| | 011010-011011 | 3~4 | 3 | 3 | 2 | | | | | 11~12 | |
| | 011100 | 4 | 4 | 3 | 2 | | | | | 13 | |
| | 011101 | 4 | 4 | 4 | 2 | | | | | 14 | |
| | 011110-011111 | 3~4 | 3 | 3 | 3 | | | | | 12~13 | |
| | 100000 | 4 | 4 | 3 | 3 | | | | | 14 | |
| | 100001 | 4 | 4 | 4 | 3 | | | | | 15 | |
| | 100010 | 4 | 4 | 4 | 4 | | | | | 16 | |
| 5 | 000000-000011 | 1~4 | 1 | 1 | 1 | 1 | | | | 5~8 | 49 |
| | 000100-000110 | 2~4 | 2 | 1 | 1 | 1 | | | | 7~9 | |
| | 000111-001000 | 3~4 | 3 | 1 | 1 | 1 | | | | 9~10 | |
| | 001001 | 4 | 4 | 1 | 1 | 1 | | | | 11 | |
| | 001010-001100 | 2~4 | 2 | 2 | 1 | 1 | | | | 8~10 | |
| | 001101-001110 | 3~4 | 3 | 2 | 1 | 1 | | | | 10~11 | |
| | 001111 | 4 | 4 | 2 | 1 | 1 | | | | 12 | |
| | 010000-010001 | 3~4 | 3 | 3 | 1 | 1 | | | | 11~12 | |
| | 010010 | 4 | 4 | 3 | 1 | 1 | | | | 13 | |
| | 010011 | 4 | 4 | 4 | 1 | 1 | | | | 14 | |
| | 010100-010110 | 2~4 | 2 | 2 | 2 | 1 | | | | 9~11 | |
| | 010111-011000 | 3~4 | 3 | 2 | 2 | 1 | | | | 11~12 | |
| | 011001 | 4 | 4 | 2 | 2 | 1 | | | | 13 | |
| | 011010-011011 | 3~4 | 3 | 3 | 2 | 1 | | | | 12~13 | |
| | 011100 | 4 | 4 | 3 | 2 | 1 | | | | 14 | |
| | 011101 | 4 | 4 | 4 | 2 | 1 | | | | 15 | |
| | 011110-011111 | 3~4 | 3 | 3 | 3 | 1 | | | | 13~14 | |
| | 100000 | 4 | 4 | 3 | 3 | 1 | | | | 15 | |
| | 100001 | 4 | 4 | 4 | 3 | 1 | | | | 16 | |
| | 100010-100100 | 2~4 | 2 | 2 | 2 | 2 | | | | 10~12 | |
| | 100101-100110 | 3~4 | 3 | 2 | 2 | 2 | | | | 12~13 | |
| | 100111 | 4 | 4 | 2 | 2 | 2 | | | | 14 | |
| | 101000-101001 | 3~4 | 3 | 3 | 2 | 2 | | | | 13~14 | |
| | 101010 | 4 | 4 | 3 | 2 | 2 | | | | 15 | |
| | 101011 | 4 | 4 | 4 | 2 | 2 | | | | 16 | |
| | 101100-101101 | 3~4 | 3 | 3 | 3 | 2 | | | | 14~15 | |
| | 101110 | 4 | 4 | 3 | 3 | 2 | | | | 16 | |
| | 101111-110000 | 3~4 | 3 | 3 | 3 | 3 | | | | 15~16 | |
| 6 | 000000-000011 | 1~4 | 1 | 1 | 1 | 1 | 1 | | | 6~9 | 54 |
| | 000100-000110 | 2~4 | 2 | 1 | 1 | 1 | 1 | | | 8~10 | |
| | 000111-001000 | 3~4 | 3 | 1 | 1 | 1 | 1 | | | 10~11 | |
| | 001001 | 4 | 4 | 1 | 1 | 1 | 1 | | | 12 | |
| | 001010-001100 | 2~4 | 2 | 2 | 1 | 1 | 1 | | | 9~11 | |
| | 001101-001110 | 3~4 | 3 | 2 | 1 | 1 | 1 | | | 11~12 | |
| | 001111 | 4 | 4 | 2 | 1 | 1 | 1 | | | 13 | |
| | 010000-010001 | 3~4 | 3 | 3 | 1 | 1 | 1 | | | 12~13 | |
| | 010010 | 4 | 4 | 3 | 1 | 1 | 1 | | | 14 | |
| | 010011-010101 | 2~4 | 2 | 2 | 2 | 1 | 1 | | | 10~12 | |
| | 010110-010111 | 3~4 | 3 | 2 | 2 | 1 | 1 | | | 12~13 | |
| | 011000 | 4 | 4 | 2 | 2 | 1 | 1 | | | 14 | |
| | 011001-011010 | 3~4 | 3 | 3 | 2 | 1 | 1 | | | 13~14 | |
| | 011011 | 4 | 4 | 3 | 2 | 1 | 1 | | | 15 | |
| | 011100 | 4 | 4 | 4 | 1 | 1 | 1 | | | 15 | |
| | 011101 | 4 | 4 | 4 | 2 | 1 | 1 | | | 16 | |
| | 011110-011111 | 3~4 | 3 | 3 | 3 | 1 | 1 | | | 14~15 | |
| | 100000 | 4 | 4 | 3 | 3 | 1 | 1 | | | 16 | |
| | 100001-100011 | 2~4 | 2 | 2 | 2 | 2 | 1 | | | 11~13 | |
| | 100100-100101 | 3~4 | 3 | 2 | 2 | 2 | 1 | | | 13~14 | |
| | 100110 | 4 | 4 | 2 | 2 | 2 | 1 | | | 15 | |
| | 100111-101000 | 3~4 | 3 | 3 | 2 | 2 | 1 | | | 14~15 | |
| | 101001 | 4 | 4 | 3 | 2 | 2 | 1 | | | 16 | |
| | 101010-101011 | 3~4 | 3 | 3 | 3 | 2 | 1 | | | 15~16 | |
| | 101100 | 3 | 3 | 3 | 3 | 3 | 1 | | | 16 | |

-continued

| N_STA | B5 ... B0 | Nsts (1) | Nsts (2) | Nsts (3) | Nsts (4) | Nsts (5) | Nsts (6) | Nsts (7) | Nsts (8) | Total N_STS | Number of Entries |
|---|---|---|---|---|---|---|---|---|---|---|---|
|   | 101101-101111 | 2~4 | 2 | 2 | 2 | 2 | 2 |   |   | 12~14 |   |
|   | 110000-110001 | 3~4 | 3 | 2 | 2 | 2 | 2 |   |   | 14~15 |   |
|   | 110010 | 4 | 4 | 2 | 2 | 2 | 2 |   |   | 16 |   |
|   | 110011-110100 | 3~4 | 3 | 3 | 2 | 2 | 2 |   |   | 15~16 |   |
|   | 110101 | 3 | 3 | 3 | 3 | 2 | 2 |   |   | 16 |   |
| 7 | 000000-000011 | 1~4 | 1 | 1 | 1 | 1 | 1 | 1 |   | 7~10 | 50 |
|   | 000100-000110 | 2~4 | 2 | 1 | 1 | 1 | 1 | 1 |   | 9~11 |   |
|   | 000111-001000 | 3~4 | 3 | 1 | 1 | 1 | 1 | 1 |   | 11~12 |   |
|   | 001001 | 4 | 4 | 1 | 1 | 1 | 1 | 1 |   | 13 |   |
|   | 001010-001100 | 2~4 | 2 | 2 | 1 | 1 | 1 | 1 |   | 10~12 |   |
|   | 001101-001110 | 3~4 | 3 | 2 | 1 | 1 | 1 | 1 |   | 12~13 |   |
|   | 001111 | 4 | 4 | 2 | 1 | 1 | 1 | 1 |   | 14 |   |
|   | 010000-010001 | 3~4 | 3 | 3 | 1 | 1 | 1 | 1 |   | 13~14 |   |
|   | 010010 | 4 | 4 | 3 | 1 | 1 | 1 | 1 |   | 15 |   |
|   | 010011 | 4 | 4 | 4 | 1 | 1 | 1 | 1 |   | 16 |   |
|   | 010100-010110 | 2~4 | 2 | 2 | 2 | 1 | 1 | 1 |   | 11~13 |   |
|   | 010111-011000 | 3~4 | 3 | 2 | 2 | 1 | 1 | 1 |   | 13~14 |   |
|   | 011001 | 4 | 4 | 2 | 2 | 1 | 1 | 1 |   | 15 |   |
|   | 011010-011011 | 3~4 | 3 | 3 | 2 | 1 | 1 | 1 |   | 14~15 |   |
|   | 011100 | 4 | 4 | 3 | 2 | 1 | 1 | 1 |   | 16 |   |
|   | 011101-011110 | 3~4 | 3 | 3 | 3 | 1 | 1 | 1 |   | 15~16 |   |
|   | 011111-100001 | 2~4 | 2 | 2 | 2 | 2 | 1 | 1 |   | 12~14 |   |
|   | 100010-100011 | 3~4 | 3 | 2 | 2 | 2 | 1 | 1 |   | 14~15 |   |
|   | 100100 | 4 | 4 | 2 | 2 | 2 | 1 | 1 |   | 16 |   |
|   | 100101-100110 | 3~4 | 3 | 3 | 2 | 2 | 1 | 1 |   | 15~16 |   |
|   | 100111 | 3 | 3 | 3 | 3 | 2 | 1 | 1 |   | 16 |   |
|   | 101000-101010 | 2~4 | 2 | 2 | 2 | 2 | 2 | 1 |   | 13~15 |   |
|   | 101011-101100 | 3~4 | 3 | 2 | 2 | 2 | 2 | 1 |   | 15~16 |   |
|   | 101101 | 3 | 3 | 3 | 2 | 2 | 2 | 1 |   | 16 |   |
|   | 101110-110000 | 2~4 | 2 | 2 | 2 | 2 | 2 | 2 |   | 14~16 |   |
|   | 110001 | 3 | 3 | 2 | 2 | 2 | 2 | 2 |   | 16 |   |
| 8 | 000000-000011 | 1~4 | 1 | 1 | 1 | 1 | 1 | 1 | 1 | 8~11 | 41 |
|   | 000100-000110 | 2~4 | 2 | 1 | 1 | 1 | 1 | 1 | 1 | 10~12 |   |
|   | 000111-001000 | 3~4 | 3 | 1 | 1 | 1 | 1 | 1 | 1 | 12~13 |   |
|   | 001001 | 4 | 4 | 1 | 1 | 1 | 1 | 1 | 1 | 14 |   |
|   | 001010-001100 | 2~4 | 2 | 2 | 1 | 1 | 1 | 1 | 1 | 11~13 |   |
|   | 001101-001110 | 3~4 | 3 | 2 | 1 | 1 | 1 | 1 | 1 | 13~14 |   |
|   | 001111 | 4 | 4 | 2 | 1 | 1 | 1 | 1 | 1 | 15 |   |
|   | 010000-010001 | 3~4 | 3 | 3 | 1 | 1 | 1 | 1 | 1 | 14~15 |   |
|   | 010010 | 4 | 4 | 3 | 1 | 1 | 1 | 1 | 1 | 16 |   |
|   | 010011-010101 | 2~4 | 2 | 2 | 2 | 1 | 1 | 1 | 1 | 12~14 |   |
|   | 010110-010111 | 3~4 | 3 | 2 | 2 | 1 | 1 | 1 | 1 | 14~15 |   |
|   | 011000 | 4 | 4 | 2 | 2 | 1 | 1 | 1 | 1 | 16 |   |
|   | 011001-011010 | 3~4 | 3 | 3 | 2 | 1 | 1 | 1 | 1 | 15~16 |   |
|   | 011011 | 3 | 3 | 3 | 3 | 1 | 1 | 1 | 1 | 16 |   |
|   | 011100-011110 | 2~4 | 2 | 2 | 2 | 2 | 1 | 1 | 1 | 13~14 |   |
|   | 011111-100000 | 3~4 | 3 | 2 | 2 | 2 | 1 | 1 | 1 | 15~16 |   |
|   | 100001 | 3 | 3 | 3 | 2 | 2 | 1 | 1 | 1 | 16 |   |
|   | 100010-100100 | 2~4 | 2 | 2 | 2 | 2 | 2 | 1 | 1 | 14~16 |   |
|   | 100101 | 3 | 3 | 2 | 2 | 2 | 2 | 1 | 1 | 16 |   |
|   | 100110-100111 | 2~3 | 2 | 2 | 2 | 2 | 2 | 2 | 1 | 15~16 |   |
|   | 101000 | 2 | 2 | 2 | 2 | 2 | 2 | 2 | 2 | 16. |   |

2. The first wireless device of claim 1, further comprising: a non-transitory storage medium to store the spatial configuration table, wherein the different spatial configurations are represented by respective entries of the spatial configuration table.

3. The first wireless device of claim 1, wherein the control information element further indicates how many wireless devices are allocated spatial streams.

4. The first wireless device of claim 1, wherein the control information element is part of a preamble of a physical data unit.

5. The first wireless device of claim 1, wherein the control information element is part of a signal (SIG) field in a physical header of a wireless local area network (WLAN) frame.

6. The first wireless device of claim 5, wherein the control information element includes a user specific field of the SIG field, the user specific field further comprising the value of the six-bit index, and an identifier of a wireless device of the plurality of wireless devices.

7. The first wireless device of claim 6, wherein the control information element includes a common field of the SIG field, the common field comprising a value indicating how many wireless devices are allocated spatial streams.

8. The first wireless device of claim 1, wherein the first wireless device is an access point (AP).

9. The first wireless device of claim 1, wherein the network interface is to perform multi-user multiple-input and multiple-output (MU-MIMO) communications using up to the 16 spatial streams.

10. The first wireless device of claim 1, wherein the control information element further comprises a parameter that is set to a parameter value specifying how many wireless devices are allocated spatial streams, wherein a combination including the value of the six-bit index and the parameter value of the parameter maps to a respective entry of entries in the spatial configuration table that represent the different spatial configurations.

11. A method performed by a first wireless device comprising:

allocating at least one spatial stream of 16 available spatial streams to a plurality of wireless devices in a wireless network, such that no wireless device of the plurality of wireless devices is allocated more than 4 spatial streams; and sending a control information element indicating the allocating the at least one spatial stream to the plurality of wireless devices, wherein the control information element comprises a value of a six-bit index that maps to a respective spatial configuration of different spatial configurations of a spatial configuration table, wherein the different spatial configurations correspond to different allocations of spatial streams to the plurality of wireless devices, and the spatial configuration table comprises:

| N_STA | B5...B0 | Nsts (1) | Nsts (2) | Nsts (3) | Nsts (4) | Nsts (5) | Nsts (6) | Nsts (7) | Nsts (8) | Total N_STS | Number of Entries |
|---|---|---|---|---|---|---|---|---|---|---|---|
| 2 | 000000-000011 | 1~4 | 1 | | | | | | | 2~5 | 10 |
|  | 000100-000110 | 2~4 | 2 | | | | | | | 4~6 | |
|  | 000111-001000 | 3~4 | 3 | | | | | | | 6~7 | |
|  | 001001 | 4 | 4 | | | | | | | 8 | |
| 3 | 000000-000011 | 1~4 | 1 | 1 | | | | | | 3~6 | 20 |
|  | 000100-000110 | 2~4 | 2 | 1 | | | | | | 5~7 | |
|  | 000111-001000 | 3~4 | 3 | 1 | | | | | | 7~8 | |
|  | 001001 | 4 | 4 | 1 | | | | | | 9 | |
|  | 001010-001100 | 2~4 | 2 | 2 | | | | | | 6~8 | |
|  | 001101-001110 | 3~4 | 3 | 2 | | | | | | 8~9 | |
|  | 001111 | 4 | 4 | 2 | | | | | | 10 | |
|  | 010000-010001 | 3~4 | 3 | 3 | | | | | | 9~10 | |
|  | 010010 | 4 | 4 | 3 | | | | | | 11 | |
|  | 010011 | 4 | 4 | 4 | | | | | | 12 | |
| 4 | 000000-000011 | 1~4 | 1 | 1 | 1 | | | | | 4~7 | 35 |
|  | 000100-000110 | 2~4 | 2 | 1 | 1 | | | | | 6~8 | |
|  | 000111-001000 | 3~4 | 3 | 1 | 1 | | | | | 8~9 | |
|  | 001001 | 4 | 4 | 1 | 1 | | | | | 10 | |
|  | 001010-001100 | 2~4 | 2 | 2 | 1 | | | | | 7~9 | |
|  | 001101-001110 | 3~4 | 3 | 2 | 1 | | | | | 9~10 | |
|  | 001111 | 4 | 4 | 2 | 1 | | | | | 11 | |
|  | 010000-010001 | 3~4 | 3 | 3 | 1 | | | | | 10~11 | |
|  | 010010 | 4 | 4 | 3 | 1 | | | | | 12 | |
|  | 010011 | 4 | 4 | 4 | 1 | | | | | 13 | |
|  | 010100-010110 | 2~4 | 2 | 2 | 2 | | | | | 8~10 | |
|  | 010111-011000 | 3~4 | 3 | 2 | 2 | | | | | 10~11 | |
|  | 011001 | 4 | 4 | 2 | 2 | | | | | 12 | |
|  | 011010-011011 | 3~4 | 3 | 3 | 2 | | | | | 11~12 | |
|  | 011100 | 4 | 4 | 3 | 2 | | | | | 13 | |
|  | 011101 | 4 | 4 | 4 | 2 | | | | | 14 | |
|  | 011110-011111 | 3~4 | 3 | 3 | 3 | | | | | 12~13 | |
|  | 100000 | 4 | 4 | 3 | 3 | | | | | 14 | |
|  | 100001 | 4 | 4 | 4 | 3 | | | | | 15 | |
|  | 100010 | 4 | 4 | 4 | 4 | | | | | 16 | |
| 5 | 000000-000011 | 1~4 | 1 | 1 | 1 | 1 | | | | 5~8 | 49 |
|  | 000100-000110 | 2~4 | 2 | 1 | 1 | 1 | | | | 7~9 | |
|  | 000111-001000 | 3~4 | 3 | 1 | 1 | 1 | | | | 9~10 | |
|  | 001001 | 4 | 4 | 1 | 1 | 1 | | | | 11 | |
|  | 001010-001100 | 2~4 | 2 | 2 | 1 | 1 | | | | 8~10 | |
|  | 001101-001110 | 3~4 | 3 | 2 | 1 | 1 | | | | 10~11 | |
|  | 001111 | 4 | 4 | 2 | 1 | 1 | | | | 12 | |
|  | 010000-010001 | 3~4 | 3 | 3 | 1 | 1 | | | | 11~12 | |
|  | 010010 | 4 | 4 | 3 | 1 | 1 | | | | 13 | |
|  | 010011 | 4 | 4 | 4 | 1 | 1 | | | | 14 | |
|  | 010100-010110 | 2~4 | 2 | 2 | 2 | 1 | | | | 9~11 | |
|  | 010111-011000 | 3~4 | 3 | 2 | 2 | 1 | | | | 11~12 | |
|  | 011001 | 4 | 4 | 2 | 2 | 1 | | | | 13 | |
|  | 011010-011011 | 3~4 | 3 | 3 | 2 | 1 | | | | 12~13 | |
|  | 011100 | 4 | 4 | 3 | 2 | 1 | | | | 14 | |
|  | 011101 | 4 | 4 | 4 | 2 | 1 | | | | 15 | |
|  | 011110-011111 | 3~4 | 3 | 3 | 3 | 1 | | | | 13~14 | |
|  | 100000 | 4 | 4 | 3 | 3 | 1 | | | | 15 | |
|  | 100001 | 4 | 4 | 4 | 3 | 1 | | | | 16 | |
|  | 100010-100100 | 2~4 | 2 | 2 | 2 | 2 | | | | 10~12 | |
|  | 100101-100110 | 3~4 | 3 | 2 | 2 | 2 | | | | 12~13 | |
|  | 100111 | 4 | 4 | 2 | 2 | 2 | | | | 14 | |
|  | 101000-101001 | 3~4 | 3 | 3 | 2 | 2 | | | | 13~14 | |
|  | 101010 | 4 | 4 | 3 | 2 | 2 | | | | 15 | |
|  | 101011 | 4 | 4 | 4 | 2 | 2 | | | | 16 | |
|  | 101100-101101 | 3~4 | 3 | 3 | 3 | 2 | | | | 14~15 | |
|  | 101110 | 4 | 4 | 3 | 3 | 2 | | | | 16 | |
|  | 101111-110000 | 3~4 | 3 | 3 | 3 | 3 | | | | 15~16 | |

-continued

| N_STA | B5 ... B0 | Nsts (1) | Nsts (2) | Nsts (3) | Nsts (4) | Nsts (5) | Nsts (6) | Nsts (7) | Nsts (8) | Total N_STS | Number of Entries |
|---|---|---|---|---|---|---|---|---|---|---|---|
| 6 | 000000-000011 | 1~4 | 1 | 1 | 1 | 1 | 1 | | | 6~9 | 54 |
| | 000100-000110 | 2~4 | 2 | 1 | 1 | 1 | 1 | | | 8~10 | |
| | 000111-001000 | 3~4 | 3 | 1 | 1 | 1 | 1 | | | 10~11 | |
| | 001001 | 4 | 4 | 1 | 1 | 1 | 1 | | | 12 | |
| | 001010-001100 | 2~4 | 2 | 2 | 1 | 1 | 1 | | | 9~11 | |
| | 001101-001110 | 3~4 | 3 | 2 | 1 | 1 | 1 | | | 11~12 | |
| | 001111 | 4 | 4 | 2 | 1 | 1 | 1 | | | 13 | |
| | 010000-010001 | 3~4 | 3 | 3 | 1 | 1 | 1 | | | 12~13 | |
| | 010010 | 4 | 4 | 3 | 1 | 1 | 1 | | | 14 | |
| | 010011-010101 | 2~4 | 2 | 2 | 2 | 1 | 1 | | | 10~12 | |
| | 010110-010111 | 3~4 | 3 | 2 | 2 | 1 | 1 | | | 12~13 | |
| | 011000 | 4 | 4 | 2 | 2 | 1 | 1 | | | 14 | |
| | 011001-011010 | 3~4 | 3 | 3 | 2 | 1 | 1 | | | 13~14 | |
| | 011011 | 4 | 4 | 3 | 2 | 1 | 1 | | | 15 | |
| | 011100 | 4 | 4 | 4 | 1 | 1 | 1 | | | 15 | |
| | 011101 | 4 | 4 | 4 | 2 | 1 | 1 | | | 16 | |
| | 011110-011111 | 3~4 | 3 | 3 | 3 | 1 | 1 | | | 14~15 | |
| | 100000 | 4 | 4 | 3 | 3 | 1 | 1 | | | 16 | |
| | 100001-100011 | 2~4 | 2 | 2 | 2 | 2 | 1 | | | 11~13 | |
| | 100100-100101 | 3~4 | 3 | 2 | 2 | 2 | 1 | | | 13~14 | |
| | 100110 | 4 | 4 | 2 | 2 | 2 | 1 | | | 15 | |
| | 100111-101000 | 3~4 | 3 | 3 | 2 | 2 | 1 | | | 14~15 | |
| | 101001 | 4 | 4 | 3 | 2 | 2 | 1 | | | 16 | |
| | 101010-101011 | 3~4 | 3 | 3 | 3 | 2 | 1 | | | 15~16 | |
| | 101100 | 3 | 3 | 3 | 3 | 3 | 1 | | | 16 | |
| | 101101-101111 | 2~4 | 2 | 2 | 2 | 2 | 2 | | | 12~14 | |
| | 110000-110001 | 3~4 | 3 | 2 | 2 | 2 | 2 | | | 14~15 | |
| | 110010 | 4 | 4 | 2 | 2 | 2 | 2 | | | 16 | |
| | 110011-110100 | 3~4 | 3 | 3 | 2 | 2 | 2 | | | 15~16 | |
| | 110101 | 3 | 3 | 3 | 3 | 2 | 2 | | | 16 | |
| 7 | 000000-000011 | 1~4 | 1 | 1 | 1 | 1 | 1 | 1 | | 7~10 | 50 |
| | 000100-000110 | 2~4 | 2 | 1 | 1 | 1 | 1 | 1 | | 9~11 | |
| | 000111-001000 | 3~4 | 3 | 1 | 1 | 1 | 1 | 1 | | 11~12 | |
| | 001001 | 4 | 4 | 1 | 1 | 1 | 1 | 1 | | 13 | |
| | 001010-001100 | 2~4 | 2 | 2 | 1 | 1 | 1 | 1 | | 10~12 | |
| | 001101-001110 | 3~4 | 3 | 2 | 1 | 1 | 1 | 1 | | 12~13 | |
| | 001111 | 4 | 4 | 2 | 1 | 1 | 1 | 1 | | 14 | |
| | 010000-010001 | 3~4 | 3 | 3 | 1 | 1 | 1 | 1 | | 13~14 | |
| | 010010 | 4 | 4 | 3 | 1 | 1 | 1 | 1 | | 15 | |
| | 010011 | 4 | 4 | 4 | 1 | 1 | 1 | 1 | | 16 | |
| | 010100-010110 | 2~4 | 2 | 2 | 2 | 1 | 1 | 1 | | 11~13 | |
| | 010111-011000 | 3~4 | 3 | 2 | 2 | 1 | 1 | 1 | | 13~14 | |
| | 011001 | 4 | 4 | 2 | 2 | 1 | 1 | 1 | | 15 | |
| | 011010-011011 | 3~4 | 3 | 3 | 2 | 1 | 1 | 1 | | 14~15 | |
| | 011100 | 4 | 4 | 3 | 2 | 1 | 1 | 1 | | 16 | |
| | 011101-011110 | 3~4 | 3 | 3 | 3 | 1 | 1 | 1 | | 15~16 | |
| | 011111-100001 | 2~4 | 2 | 2 | 2 | 2 | 1 | 1 | | 12~14 | |
| | 100010-100011 | 3~4 | 3 | 2 | 2 | 2 | 1 | 1 | | 14-15 | |
| | 100100 | 4 | 4 | 2 | 2 | 2 | 1 | 1 | | 16 | |
| | 100101-100110 | 3~4 | 3 | 3 | 2 | 2 | 1 | 1 | | 15~16 | |
| | 100111 | 3 | 3 | 3 | 3 | 2 | 1 | 1 | | 16 | |
| | 101000-101010 | 2~4 | 2 | 2 | 2 | 2 | 2 | 1 | | 13~15 | |
| | 101011-101100 | 3~4 | 3 | 2 | 2 | 2 | 2 | 1 | | 15~16 | |
| | 101101 | 3 | 3 | 3 | 2 | 2 | 2 | 1 | | 16 | |
| | 101110-110000 | 2~4 | 2 | 2 | 2 | 2 | 2 | 2 | | 14~16 | |
| | 110001 | 3 | 3 | 2 | 2 | 2 | 2 | 2 | | 16 | |
| 8 | 000000-000011 | 1~4 | 1 | 1 | 1 | 1 | 1 | 1 | 1 | 8~11 | 41 |
| | 000100-000110 | 2~4 | 2 | 1 | 1 | 1 | 1 | 1 | 1 | 10~12 | |
| | 000111-001000 | 3~4 | 3 | 1 | 1 | 1 | 1 | 1 | 1 | 12~13 | |
| | 001001 | 4 | 4 | 1 | 1 | 1 | 1 | 1 | 1 | 14 | |
| | 001010-001100 | 2~4 | 2 | 2 | 1 | 1 | 1 | 1 | 1 | 11~13 | |
| | 001101-001110 | 3~4 | 3 | 2 | 1 | 1 | 1 | 1 | 1 | 13~14 | |
| | 001111 | 4 | 4 | 2 | 1 | 1 | 1 | 1 | 1 | 15 | |
| | 010000-010001 | 3~4 | 3 | 3 | 1 | 1 | 1 | 1 | 1 | 14~15 | |
| | 010010 | 4 | 4 | 3 | 1 | 1 | 1 | 1 | 1 | 16 | |
| | 010011-010101 | 2~4 | 2 | 2 | 2 | 1 | 1 | 1 | 1 | 12~14 | |
| | 010110-010111 | 3~4 | 3 | 2 | 2 | 1 | 1 | 1 | 1 | 14~15 | |
| | 011000 | 4 | 4 | 2 | 2 | 1 | 1 | 1 | 1 | 16 | |
| | 011001-011010 | 3~4 | 3 | 3 | 2 | 1 | 1 | 1 | 1 | 15~16 | |
| | 011011 | 3 | 3 | 3 | 3 | 1 | 1 | 1 | 1 | 16 | |
| | 011100-011110 | 2~4 | 2 | 2 | 2 | 2 | 1 | 1 | 1 | 13~14 | |
| | 011111-100000 | 3~4 | 3 | 2 | 2 | 2 | 1 | 1 | 1 | 15~16 | |
| | 100001 | 3 | 3 | 3 | 2 | 2 | 1 | 1 | 1 | 16 | |
| | 100010-100100 | 2~4 | 2 | 2 | 2 | 2 | 2 | 1 | 1 | 14~16 | |
| | 100101 | 3 | 3 | 2 | 2 | 2 | 2 | 1 | 1 | 16 | |

-continued

| N_STA | B5...B0 | Nsts (1) | Nsts (2) | Nsts (3) | Nsts (4) | Nsts (5) | Nsts (6) | Nsts (7) | Nsts (8) | Total N_STS | Number of Entries |
|---|---|---|---|---|---|---|---|---|---|---|---|
| | 100110-100111 | 2-3 | 2 | 2 | 2 | 2 | 2 | 2 | 1 | 15~16 | |
| | 101000 | 2 | 2 | 2 | 2 | 2 | 2 | 2 | 2 | 16. | |

12. The method of claim 11, further comprising:
storing the spatial configuration table in a storage medium of the first wireless device, wherein the different spatial configurations are represented by respective entries of the spatial configuration table.

13. The method of claim 11, further comprising:
sending a value indicating how many wireless devices are allocated spatial streams.

14. The method of claim 11, wherein the control information element is part of a preamble of a physical data unit.

15. The method of claim 11, wherein the control information element is part of a signal (SIG) field in a physical header of a wireless local area network (WLAN) frame.

16. The method of claim 11, wherein the control information element further comprises a parameter that is set to a parameter value specifying how many wireless devices are allocated spatial streams, wherein a combination including the value of the six-bit index and the parameter value of the parameter maps to a respective entry of entries in the spatial configuration table that represent the different spatial configurations.

17. A first wireless device comprising:
a network interface capable of communicating over a plurality of spatial streams;
a non-transitory storage medium to store information of a spatial configuration table comprising a plurality of entries representing different allocations of spatial streams to a plurality of wireless devices, wherein none of the different allocations of spatial streams allocates more than 4 spatial streams to a wireless device; and
at least one processor configured to receive, from a second wireless device, a control information element comprising a six-bit index that maps to an entry of the plurality of entries, the entry mapped by the control information element comprising an allocation of spatial streams to at least some of the plurality of wireless devices, wherein the spatial configuration table comprises:

| N_STA | B5...B0 | Nsts (1) | Nsts (2) | Nsts (3) | Nsts (4) | Nsts (5) | Nsts (6) | Nsts (7) | Nsts (8) | Total N_STS | Number of Entries |
|---|---|---|---|---|---|---|---|---|---|---|---|
| 2 | 000000-000011 | 1~4 | 1 | | | | | | | 2~5 | 10 |
| | 000100-000110 | 2~4 | 2 | | | | | | | 4~6 | |
| | 000111-001000 | 3~4 | 3 | | | | | | | 6~7 | |
| | 001001 | 4 | 4 | | | | | | | 8 | |
| 3 | 000000-000011 | 1~4 | 1 | 1 | | | | | | 3~6 | 20 |
| | 000100-000110 | 2~4 | 2 | 1 | | | | | | 5~7 | |
| | 000111-001000 | 3~4 | 3 | 1 | | | | | | 7~8 | |
| | 001001 | 4 | 4 | 1 | | | | | | 9 | |
| | 001010-001100 | 2~4 | 2 | 2 | | | | | | 6~8 | |
| | 001101-001110 | 3~4 | 3 | 2 | | | | | | 8~9 | |
| | 001111 | 4 | 4 | 2 | | | | | | 10 | |
| | 010000-010001 | 3~4 | 3 | 3 | | | | | | 9~10 | |
| | 010010 | 4 | 4 | 3 | | | | | | 11 | |
| | 010011 | 4 | 4 | 4 | | | | | | 12 | |
| 4 | 000000-000011 | 1~4 | 1 | 1 | 1 | | | | | 4~7 | 35 |
| | 000100-000110 | 2~4 | 2 | 1 | 1 | | | | | 6~8 | |
| | 000111-001000 | 3~4 | 3 | 1 | 1 | | | | | 8~9 | |
| | 001001 | 4 | 4 | 1 | 1 | | | | | 10 | |
| | 001010-001100 | 2~4 | 2 | 2 | 1 | | | | | 7~9 | |
| | 001101-001110 | 3~4 | 3 | 2 | 1 | | | | | 9~10 | |
| | 001111 | 4 | 4 | 2 | 1 | | | | | 11 | |
| | 010000-010001 | 3~4 | 3 | 3 | 1 | | | | | 10~11 | |
| | 010010 | 4 | 4 | 3 | 1 | | | | | 12 | |
| | 010011 | 4 | 4 | 4 | 1 | | | | | 13 | |
| | 010100-010110 | 2~4 | 2 | 2 | 2 | | | | | 8~10 | |
| | 010111-011000 | 3~4 | 3 | 2 | 2 | | | | | 10~11 | |
| | 011001 | 4 | 4 | 2 | 2 | | | | | 12 | |
| | 011010-011011 | 3~4 | 3 | 3 | 2 | | | | | 11~12 | |
| | 011100 | 4 | 4 | 3 | 2 | | | | | 13 | |
| | 011101 | 4 | 4 | 4 | 2 | | | | | 14 | |
| | 011110-011111 | 3~4 | 3 | 3 | 3 | | | | | 12~13 | |
| | 100000 | 4 | 4 | 3 | 3 | | | | | 14 | |
| | 100001 | 4 | 4 | 4 | 3 | | | | | 15 | |
| | 100010 | 4 | 4 | 4 | 4 | | | | | 16 | |
| 5 | 000000-000011 | 1~4 | 1 | 1 | 1 | 1 | | | | 5~8 | 49 |
| | 000100-000110 | 2~4 | 2 | 1 | 1 | 1 | | | | 7~9 | |
| | 000111-001000 | 3~4 | 3 | 1 | 1 | 1 | | | | 9~10 | |
| | 001001 | 4 | 4 | 1 | 1 | 1 | | | | 11 | |
| | 001010-001100 | 2~4 | 2 | 2 | 1 | 1 | | | | 8~10 | |
| | 001101-001110 | 3~4 | 3 | 2 | 1 | 1 | | | | 10~11 | |
| | 001111 | 4 | 4 | 2 | 1 | 1 | | | | 12 | |

-continued

| N_STA | B5 ... B0 | Nsts (1) | Nsts (2) | Nsts (3) | Nsts (4) | Nsts (5) | Nsts (6) | Nsts (7) | Nsts (8) | Total N_STS | Number of Entries |
|---|---|---|---|---|---|---|---|---|---|---|---|
| | 010000-010001 | 3~4 | 3 | 3 | 1 | 1 | | | | 11~12 | |
| | 010010 | 4 | 4 | 3 | 1 | 1 | | | | 13 | |
| | 010011 | 4 | 4 | 4 | 1 | 1 | | | | 14 | |
| | 010100-010110 | 2~4 | 2 | 2 | 2 | 1 | | | | 9~11 | |
| | 010111-011000 | 3~4 | 3 | 2 | 2 | 1 | | | | 11~12 | |
| | 011001 | 4 | 4 | 2 | 2 | 1 | | | | 13 | |
| | 011010-011011 | 3~4 | 3 | 3 | 2 | 1 | | | | 12~13 | |
| | 011100 | 4 | 4 | 3 | 2 | 1 | | | | 14 | |
| | 011101 | 4 | 4 | 4 | 2 | 1 | | | | 15 | |
| | 011110-011111 | 3~4 | 3 | 3 | 3 | 1 | | | | 13~14 | |
| | 100000 | 4 | 4 | 3 | 3 | 1 | | | | 15 | |
| | 100001 | 4 | 4 | 4 | 3 | 1 | | | | 16 | |
| | 100010-100100 | 2~4 | 2 | 2 | 2 | 2 | | | | 10~12 | |
| | 100101-100110 | 3~4 | 3 | 2 | 2 | 2 | | | | 12~13 | |
| | 100111 | 4 | 4 | 2 | 2 | 2 | | | | 14 | |
| | 101000-101001 | 3~4 | 3 | 3 | 2 | 2 | | | | 13~14 | |
| | 101010 | 4 | 4 | 3 | 2 | 2 | | | | 15 | |
| | 101011 | 4 | 4 | 4 | 2 | 2 | | | | 16 | |
| | 101100-101101 | 3~4 | 3 | 3 | 3 | 2 | | | | 14~15 | |
| | 101110 | 4 | 4 | 3 | 3 | 2 | | | | 16 | |
| | 101111-110000 | 3~4 | 3 | 3 | 3 | 3 | | | | 15~16 | |
| 6 | 000000-000011 | 1~4 | 1 | 1 | 1 | 1 | 1 | | | 6~9 | 54 |
| | 000100-000110 | 2~4 | 2 | 1 | 1 | 1 | 1 | | | 8~10 | |
| | 000111-001000 | 3~4 | 3 | 1 | 1 | 1 | 1 | | | 10~11 | |
| | 001001 | 4 | 4 | 1 | 1 | 1 | 1 | | | 12 | |
| | 001010-001100 | 2~4 | 2 | 2 | 1 | 1 | 1 | | | 9~11 | |
| | 001101-001110 | 3~4 | 3 | 2 | 1 | 1 | 1 | | | 11~12 | |
| | 001111 | 4 | 4 | 2 | 1 | 1 | 1 | | | 13 | |
| | 010000-010001 | 3~4 | 3 | 3 | 1 | 1 | 1 | | | 12~13 | |
| | 010010 | 4 | 4 | 3 | 1 | 1 | 1 | | | 14 | |
| | 010011-010101 | 2~4 | 2 | 2 | 2 | 1 | 1 | | | 10~12 | |
| | 010110-010111 | 3~4 | 3 | 2 | 2 | 1 | 1 | | | 12~13 | |
| | 011000 | 4 | 4 | 2 | 2 | 1 | 1 | | | 14 | |
| | 011001-011010 | 3~4 | 3 | 3 | 2 | 1 | 1 | | | 13~14 | |
| | 011011 | 4 | 4 | 3 | 2 | 1 | 1 | | | 15 | |
| | 011100 | 4 | 4 | 4 | 1 | 1 | 1 | | | 15 | |
| | 011101 | 4 | 4 | 4 | 2 | 1 | 1 | | | 16 | |
| | 011110-011111 | 3~4 | 3 | 3 | 3 | 1 | 1 | | | 14~15 | |
| | 100000 | 4 | 4 | 3 | 3 | 1 | 1 | | | 16 | |
| | 100001-100011 | 2~4 | 2 | 2 | 2 | 2 | 1 | | | 11~13 | |
| | 100100-100101 | 3~4 | 3 | 2 | 2 | 2 | 1 | | | 13~14 | |
| | 100110 | 4 | 4 | 2 | 2 | 2 | 1 | | | 15 | |
| | 100111-101000 | 3~4 | 3 | 3 | 2 | 2 | 1 | | | 14~15 | |
| | 101001 | 4 | 4 | 3 | 2 | 2 | 1 | | | 16 | |
| | 101010-101011 | 3~4 | 3 | 3 | 3 | 2 | 1 | | | 15~16 | |
| | 101100 | 3 | 3 | 3 | 3 | 3 | 1 | | | 16 | |
| | 101101-101111 | 2~4 | 2 | 2 | 2 | 2 | 2 | | | 12~14 | |
| | 110000-110001 | 3~4 | 3 | 2 | 2 | 2 | 2 | | | 14~15 | |
| | 110010 | 4 | 4 | 2 | 2 | 2 | 2 | | | 16 | |
| | 110011-110100 | 3~4 | 3 | 3 | 2 | 2 | 2 | | | 15~16 | |
| | 110101 | 3 | 3 | 3 | 3 | 2 | 2 | | | 16 | |
| 7 | 000000-000011 | 1~4 | 1 | 1 | 1 | 1 | 1 | 1 | | 7~10 | 50 |
| | 000100-000110 | 2~4 | 2 | 1 | 1 | 1 | 1 | 1 | | 9~11 | |
| | 000111-001000 | 3~4 | 3 | 1 | 1 | 1 | 1 | 1 | | 11~12 | |
| | 001001 | 4 | 4 | 1 | 1 | 1 | 1 | 1 | | 13 | |
| | 001010-001100 | 2~4 | 2 | 2 | 1 | 1 | 1 | 1 | | 10~12 | |
| | 001101-001110 | 3~4 | 3 | 2 | 1 | 1 | 1 | 1 | | 12~13 | |
| | 001111 | 4 | 4 | 2 | 1 | 1 | 1 | 1 | | 14 | |
| | 010000-010001 | 3~4 | 3 | 3 | 1 | 1 | 1 | 1 | | 13~14 | |
| | 010010 | 4 | 4 | 3 | 1 | 1 | 1 | 1 | | 15 | |
| | 010011 | 4 | 4 | 4 | 1 | 1 | 1 | 1 | | 16 | |
| | 010100-010110 | 2~4 | 2 | 2 | 2 | 1 | 1 | 1 | | 11~13 | |
| | 010111-011000 | 3~4 | 3 | 2 | 2 | 1 | 1 | 1 | | 13~14 | |
| | 011001 | 4 | 4 | 2 | 2 | 1 | 1 | 1 | | 15 | |
| | 011010-011011 | 3~4 | 3 | 3 | 2 | 1 | 1 | 1 | | 14~15 | |
| | 011100 | 4 | 4 | 3 | 2 | 1 | 1 | 1 | | 16 | |
| | 011101-011110 | 3~4 | 3 | 3 | 3 | 1 | 1 | 1 | | 15~16 | |
| | 011111-100001 | 2~4 | 2 | 2 | 2 | 2 | 1 | 1 | | 12~14 | |
| | 100010-100011 | 3~4 | 3 | 2 | 2 | 2 | 1 | 1 | | 14~15 | |
| | 100100 | 4 | 4 | 2 | 2 | 2 | 1 | 1 | | 16 | |
| | 100101-100110 | 3~4 | 3 | 3 | 2 | 2 | 1 | 1 | | 15~16 | |
| | 100111 | 3 | 3 | 3 | 3 | 2 | 1 | 1 | | 16 | |
| | 101000-101010 | 2~4 | 2 | 2 | 2 | 2 | 2 | 1 | | 13~15 | |
| | 101011-101100 | 3~4 | 3 | 2 | 2 | 2 | 2 | 1 | | 15~16 | |
| | 101101 | 3 | 3 | 3 | 2 | 2 | 2 | 1 | | 16 | |

-continued

| N_STA | B5...B0 | Nsts (1) | Nsts (2) | Nsts (3) | Nsts (4) | Nsts (5) | Nsts (6) | Nsts (7) | Nsts (8) | Total N_STS | Number of Entries |
|---|---|---|---|---|---|---|---|---|---|---|---|
| | 101110-110000 | 2~4 | 2 | 2 | 2 | 2 | 2 | 2 | | 14~16 | |
| | 110001 | 3 | 3 | 2 | 2 | 2 | 2 | 2 | | 16 | |
| 8 | 000000-000011 | 1~4 | 1 | 1 | 1 | 1 | 1 | 1 | 1 | 8~11 | 41 |
| | 000100-000110 | 2~4 | 2 | 1 | 1 | 1 | 1 | 1 | 1 | 10~12 | |
| | 000111-001000 | 3~4 | 3 | 1 | 1 | 1 | 1 | 1 | 1 | 12~13 | |
| | 001001 | 4 | 4 | 1 | 1 | 1 | 1 | 1 | 1 | 14 | |
| | 001010-001100 | 2~4 | 2 | 2 | 1 | 1 | 1 | 1 | 1 | 11~13 | |
| | 001101-001110 | 3~4 | 3 | 2 | 1 | 1 | 1 | 1 | 1 | 13~14 | |
| | 001111 | 4 | 4 | 2 | 1 | 1 | 1 | 1 | 1 | 15 | |
| | 010000-010001 | 3~4 | 3 | 3 | 1 | 1 | 1 | 1 | 1 | 14~15 | |
| | 010010 | 4 | 4 | 3 | 1 | 1 | 1 | 1 | 1 | 16 | |
| | 010011-010101 | 2~4 | 2 | 2 | 2 | 1 | 1 | 1 | 1 | 12~14 | |
| | 010110-010111 | 3~4 | 3 | 2 | 2 | 1 | 1 | 1 | 1 | 14~15 | |
| | 011000 | 4 | 4 | 2 | 2 | 1 | 1 | 1 | 1 | 16 | |
| | 011001-011010 | 3~4 | 3 | 3 | 2 | 1 | 1 | 1 | 1 | 15~16 | |
| | 011011 | 3 | 3 | 3 | 3 | 1 | 1 | 1 | 1 | 16 | |
| | 011100-011110 | 2~4 | 2 | 2 | 2 | 2 | 1 | 1 | 1 | 13~14 | |
| | 011111-100000 | 3~4 | 3 | 2 | 2 | 2 | 1 | 1 | 1 | 15~16 | |
| | 100001 | 3 | 3 | 3 | 2 | 2 | 1 | 1 | 1 | 16 | |
| | 100010-100100 | 2~4 | 2 | 2 | 2 | 2 | 2 | 1 | 1 | 14~16 | |
| | 100101 | 3 | 3 | 2 | 2 | 2 | 2 | 1 | 1 | 16 | |
| | 100110-100111 | 2~3 | 2 | 2 | 2 | 2 | 2 | 2 | 1 | 15~16 | |
| | 101000 | 2 | 2 | 2 | 2 | 2 | 2 | 2 | 2 | 16. | |

18. The first wireless device of claim 17, wherein the control information element includes indication of how many wireless devices are allocated spatial streams, and the indication of how many wireless devices are allocated spatial streams maps to the entry of the spatial configuration table.

19. The first wireless device of claim 18, wherein the six-bit index in combination with the indication of how many wireless devices are allocated spatial streams maps to the entry of the spatial configuration table.

20. The first wireless device of claim 17, wherein the control information element is part of a signal (SIG) field in a physical header of a wireless local area network (WLAN) frame.

* * * * *